United States Patent
Xu et al.

(10) Patent No.: US 12,432,367 B2
(45) Date of Patent: Sep. 30, 2025

(54) FEATURE-BASED MULTI-VIEW REPRESENTATION AND CODING

(71) Applicant: Tencent America LLC, Palo Alto, CA (US)

(72) Inventors: Xiaozhong Xu, State College, PA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 547 days.

(21) Appl. No.: 17/861,667

(22) Filed: Jul. 11, 2022

(65) Prior Publication Data

US 2023/0024288 A1     Jan. 26, 2023

Related U.S. Application Data

(60) Provisional application No. 63/221,351, filed on Jul. 13, 2021.

(51) Int. Cl.
| | | |
|---|---|---|
| H04N 19/44 | (2014.01) | |
| H04N 19/136 | (2014.01) | |
| H04N 19/172 | (2014.01) | |

(52) U.S. Cl.
CPC .......... *H04N 19/44* (2014.11); *H04N 19/136* (2014.11); *H04N 19/172* (2014.11)

(58) Field of Classification Search
CPC ..................................................... H04N 19/44
See application file for complete search history.

(56) References Cited

U.S. PATENT DOCUMENTS

| | | | |
|---|---|---|---|
| 2014/0198850 A1* | 7/2014 | Choi | H04N 19/573 375/240.15 |
| 2021/0203997 A1 | 7/2021 | Veselov et al. | |

(Continued)

FOREIGN PATENT DOCUMENTS

| | | |
|---|---|---|
| JP | 2006-081161 A | 3/2006 |
| JP | 2014-137719 A | 7/2014 |
| JP | 2014-527753 A | 10/2014 |
| JP | 2021-077376 A | 5/2021 |

OTHER PUBLICATIONS

Office Action received for Japanese Patent Application No. 2023-524147, mailed on May 21, 2024, 9 pages (4 pages of English Translation and 5 pages of Original Document).

(Continued)

*Primary Examiner* — Jerry T Jean Baptiste
(74) *Attorney, Agent, or Firm* — ARENTFOX SCHIFF LLP

(57) ABSTRACT

Aspects of the disclosure provide a method, an apparatus, and non-transitory computer-readable storage medium for video decoding. The apparatus includes processing circuitry configured to decode at least one first key picture of pictures from a multi-view bitstream. The pictures correspond to different views. The at least one first key picture corresponds to at least one first view of the different views. The processing circuitry determines first feature information of content in the at least one first key picture. The processing circuitry decode, based on the multi-view bitstream, a first feature change to the first feature information. The first feature change indicates a content change between a key picture in the at least one first key picture and a first picture. The processing circuitry reconstructs the first picture based on the decoded first feature change, the first feature information, and the key picture in the at least one first key picture.

20 Claims, 25 Drawing Sheets

(56) References Cited

U.S. PATENT DOCUMENTS

2021/0273811 A1* 9/2021 Burke .................... G06V 20/46
2024/0022766 A1* 1/2024 Ahn ......................... G06T 7/20

OTHER PUBLICATIONS

Oquab et.al., "Low Bandwidth Video/Chat Compression using Deep Generative Models", 2021 IEEE/CVF Conference on Computer Vision and Pattern Recognition Workshops (CVPRW), arXiv:2012.00328v1 [cs.CV], 2021, 11 pages.

Office Action received for Japanese Patent Application No. 2023-524147, mailed on Sep. 25, 2024, 11 pages (5 pages of English Translation and 6 pages of Original Document).

Tech Gerhard et al: "Overview of the Multiview and 3D Extensions of High Efficiency Video Coding", IEEE Transactions on Circuits and Systems for Video Technology, IEEE, USA, vol. 26, No. 1, Jan. 1, 2016, pp. 35-49.

Supplementary European Search Report issued Jul. 14, 2023 in Application No. 22839972.1 (9 pages).

Luca Baroffio et al: "Hybrid coding of visual content and local image features", arxiv.org, Cornell University Library, 201 Olin Library Cornell University Ithaca, NY 14853, Feb. 27, 2015, pp. 1-5.

Da Silva et al., "Feature-based Video Coding: Designing an RD Efficient and Search Friendly Framework", 2016 Picture Coding Symposium, Dec. 4, 2016, 5 pages.

Office Action received for Japanese Patent Application No. 2023-524147, mailed on Mar. 24, 2025, 9 pages (4 pages of English Translation and 3 pages of Original Document).

* cited by examiner

FEATURE-BASED MULTI-VIEW REPRESENTATION AND CODING

INCORPORATION BY REFERENCE

This present disclosure claims the benefit of priority to U.S. Provisional Application No. 63/221,351, "Features Based Multi-View Representation and Delivery" filed on Jul. 13, 2021, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image and/or video coding and decoding can be performed using inter-picture prediction with motion compensation. Uncompressed digital image and/or video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed image and/or video has specific bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of image and/or video coding and decoding can be the reduction of redundancy in the input image and/or video signal, through compression. Compression can help reduce the aforementioned bandwidth and/or storage space requirements, in some cases by two orders of magnitude or more. Although the descriptions herein use video encoding/decoding as illustrative examples, the same techniques can be applied to image encoding/decoding in similar fashion without departing from the spirit of the present disclosure. Both lossless compression and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding and/or decoding of spatially neighboring, and preceding in decoding order, blocks of data. Such techniques are henceforth called "intra prediction" techniques. Note that in at least some cases, intra prediction is using reference data only from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode, submode, and/or parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may itself be predicted.

Referring to FIG. 1A, depicted in the lower right is a subset of nine predictor directions known from H.265's 33 possible predictor directions (corresponding to the 33 angular modes of the 35 intra modes). The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore no negative values need to be used.

Intra picture prediction can work by copying reference sample values from the neighboring samples as appropriated by the signaled prediction direction. For example, assume the coded video bitstream includes signaling that, for this block, indicates a prediction direction consistent with arrow (102)—that is, samples are predicted from a prediction sample or samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013), and JEM/VVC/BMS, at the time of disclosure, can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 1B shows a schematic (110) that depicts 65 intra prediction directions according to JEM to illustrate the increasing number of prediction directions over time.

The mapping of intra prediction directions bits in the coded video bitstream that represent the direction can be different from video coding technology to video coding technology; and can range, for example, from simple direct mappings of prediction direction to intra prediction mode, to codewords, to complex adaptive schemes involving most probable modes, and similar techniques. In all cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 2, a current block (201) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (202 through 206, respectively). In H.265, the MV prediction can use predictors from the same reference picture that the neighboring block is using.

SUMMARY

Aspects of the disclosure provide methods and apparatuses for video encoding and decoding. In some examples, an apparatus for video decoding includes processing circuitry. The processing circuitry is configured to decode at least one first key picture of pictures from a multi-view bitstream. The pictures correspond to different views. The at least one first key picture corresponds to at least one first view of the different views. First feature information of content in the at least one first key picture of the pictures can be determined. Based on the multi-view bitstream, a first feature change to the first feature information can be decoded. The first feature change can indicate a content change between a key picture in the at least one first key picture and a first picture. The first picture can be reconstructed based on the decoded first feature change, the first feature information, and the key picture in the at least one first key picture.

In an embodiment, the at least one first key picture corresponds to a first time instance. The at least one first key picture includes multiple first key pictures. The at least one first view of the different views includes multiple first views. The first feature information includes first three-dimensional (3D) feature information indicated by the multiple first views. The first 3D feature information at the first time instance can be determined based on a first pre-determined 3D feature model and the multiple first key pictures.

In an example, the first 3D feature information is used to decode a picture of each view of the different views.

In an example, the multiple first key pictures include each key picture at the first time instance.

In an example, second 3D feature information of a content in multiple second key pictures of the pictures at the first time instance is determined based on a second pre-determined 3D feature model. The multiple second key pictures correspond to the first time instance of multiple second views in the different views.

In an example, the first feature information is associated with a first view in the at least one first view. For each view of the different views that is not the first view, the processing circuitry can determine respective feature information based on a key picture of the view and another key picture of an adjacent view of the different views. The processing circuitry can decode, based on the multi-view bitstream, a feature change to the respective feature information. The feature change corresponds to a respective picture of the view. The picture of the view can be generated based on the respective feature change, the respective feature information, and the key picture of the view.

In an example, the first picture of a view in the different views is at a second time instance.

In an example, the processing circuitry can decode a subset of the pictures corresponding to the different views. The subset of the pictures is of a first view of the at least one first view corresponding to respective time instances. The subset of the pictures of the first view can include the key picture in the at least one first key picture. The first picture is of a second view of the different views. The first picture and the key picture in the at least one first key picture correspond to a first time instance. The first feature change indicates a feature change between the first picture of the second view at the first time instance and the key picture of the first view at the first time instance.

In an example, each picture of a first view of the at least one first view is decoded as a key picture. Each picture of the first view corresponds to a respective time instance.

Aspects of the disclosure also provide a non-transitory computer-readable storage medium storing a program executable by at least one processor to perform the methods for video decoding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1A:
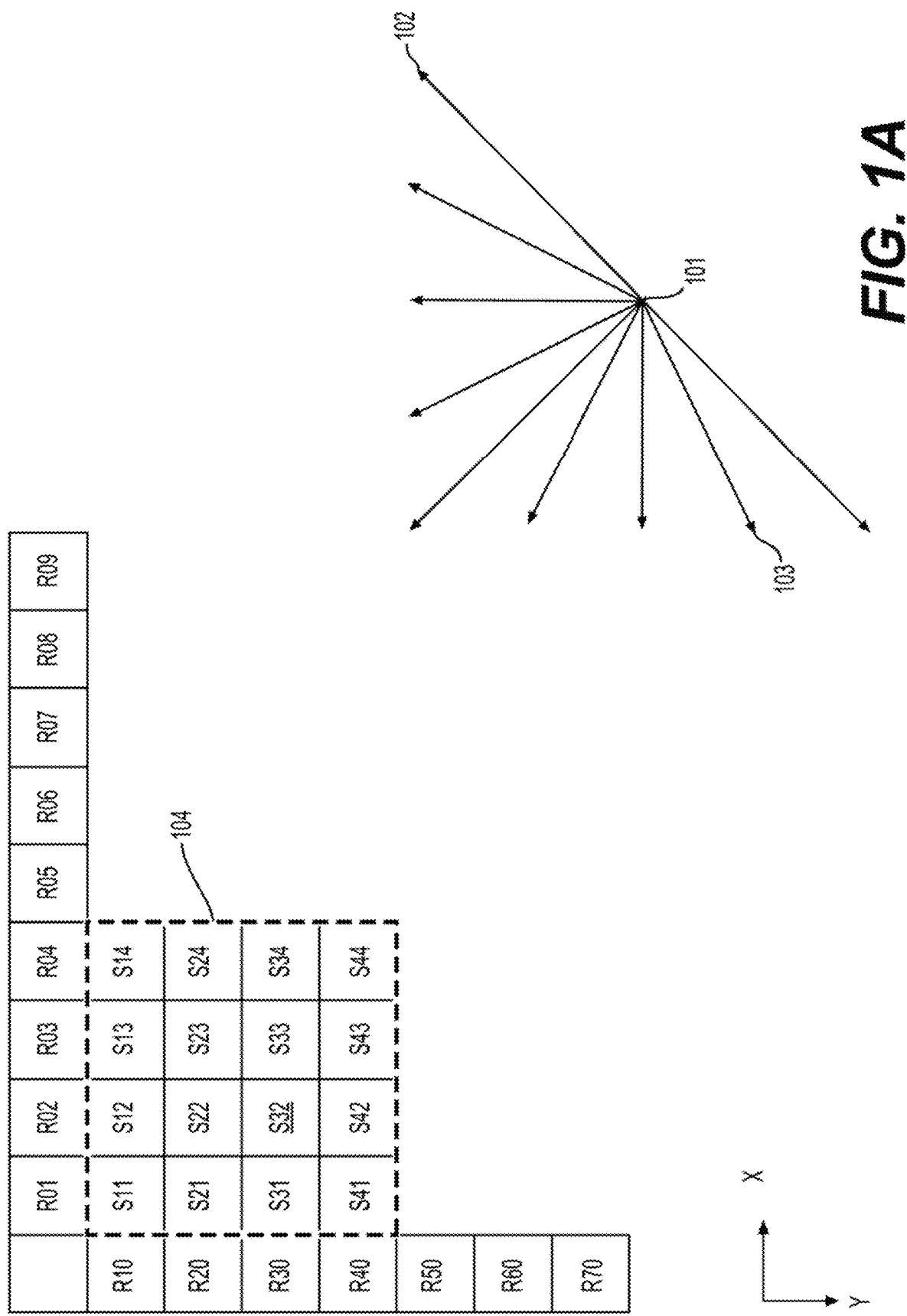
FIG. 1A is a schematic illustration of an exemplary subset of intra prediction modes.
Figure 1B:
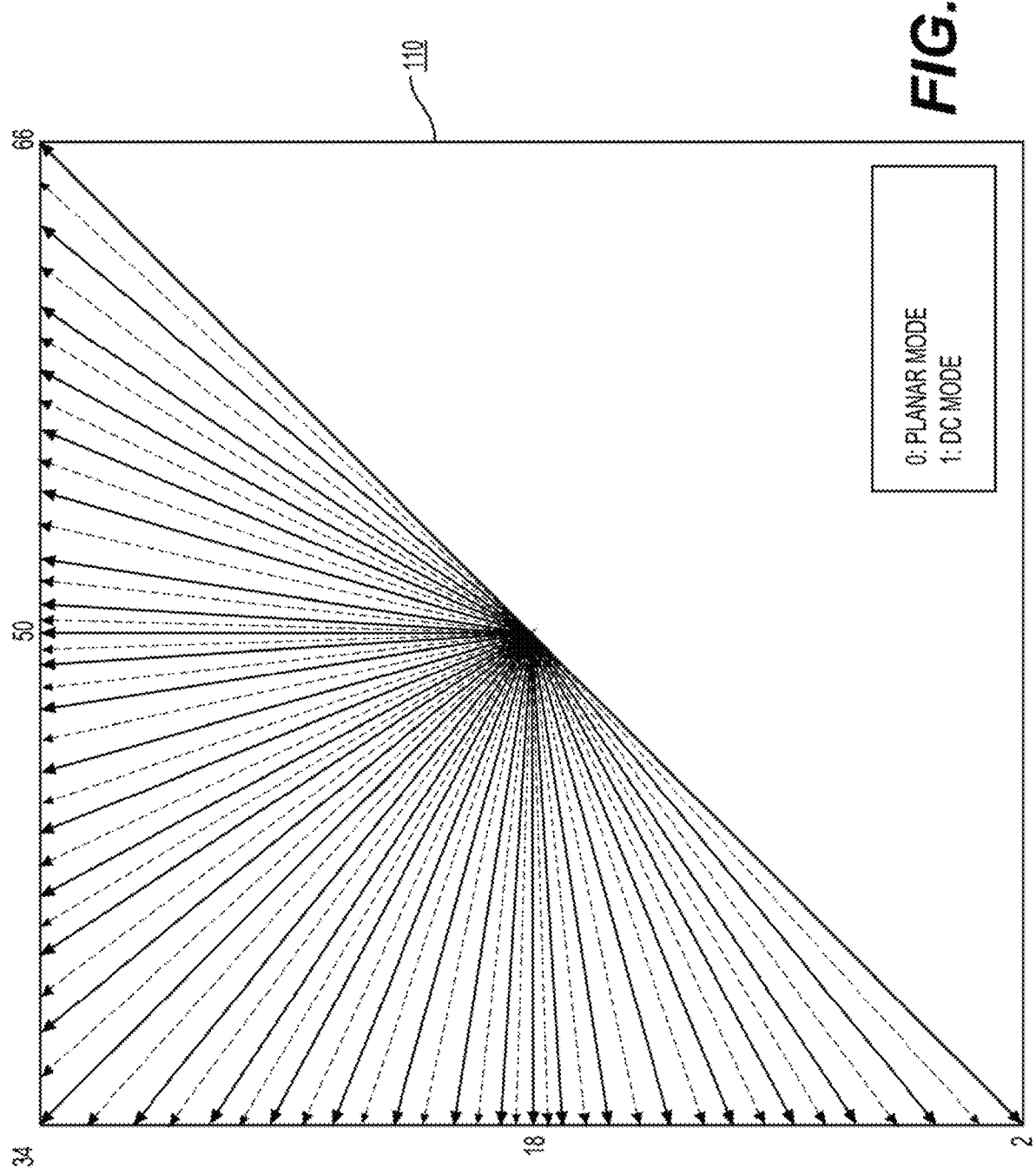
FIG. 1B is an illustration of exemplary intra prediction directions.
Figure 2:
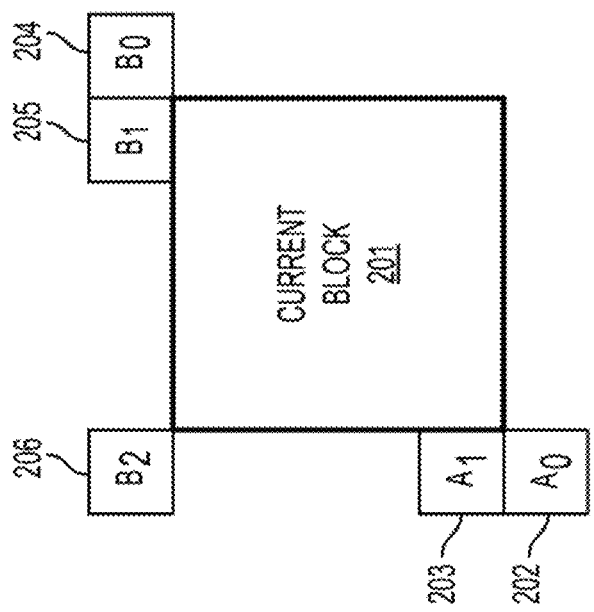
FIG. 2 shows a current block (201) and surrounding samples in accordance with an embodiment.
Figure 3:
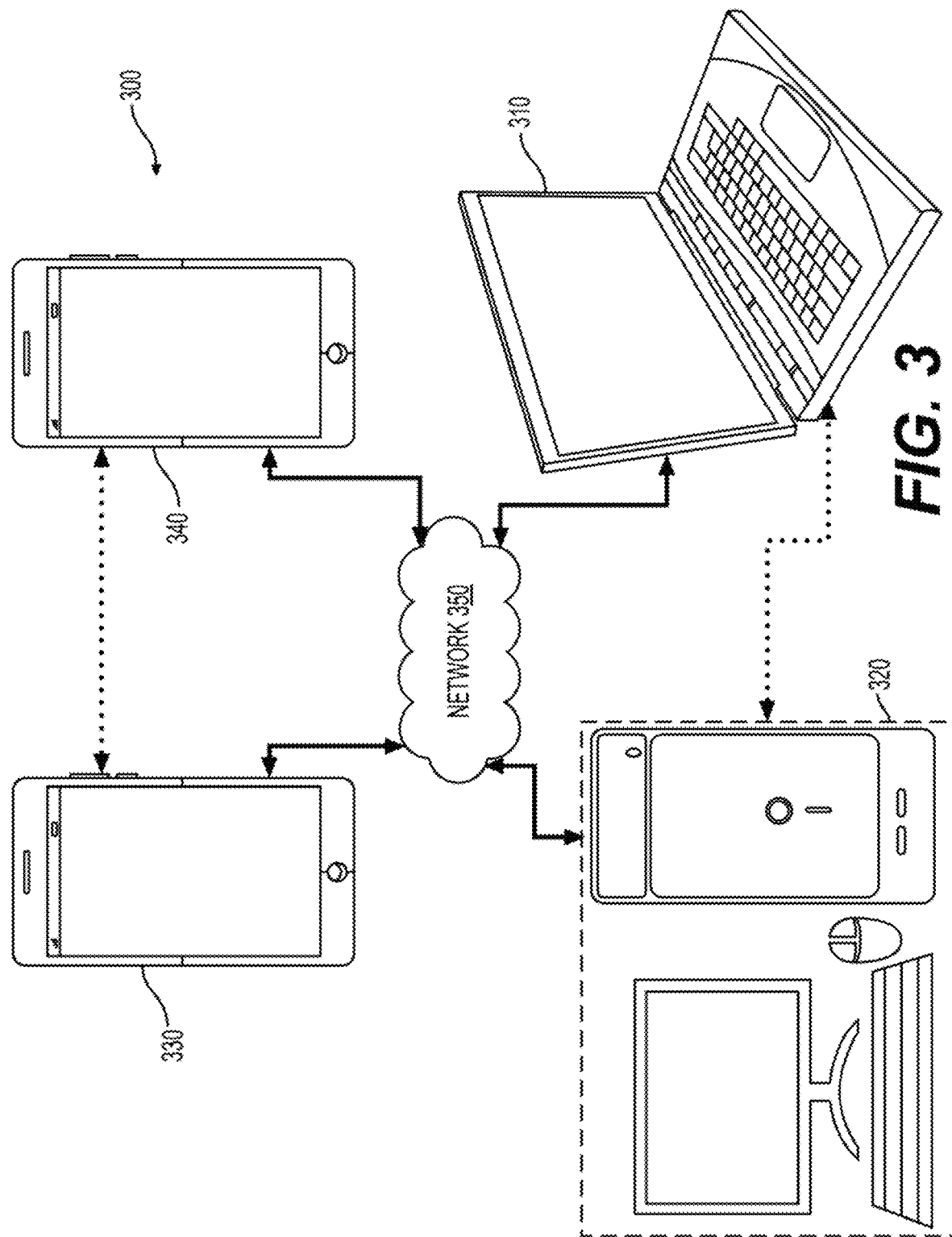
FIG. 3 is a schematic illustration of a simplified block diagram of a communication system (300) in accordance with an embodiment.

FIG. 3 illustrates a simplified block diagram of a communication system (300) according to an embodiment of the present disclosure. The communication system (300) includes a plurality of terminal devices that can communicate with each other, via, for example, a network (350). For example, the communication system (300) includes a first pair of terminal devices (310) and (320) interconnected via the network (350). In the FIG. 3 example, the first pair of terminal devices (310) and (320) performs unidirectional transmission of data. For example, the terminal device (310) may code video data (e.g., a stream of video pictures that are captured by the terminal device (310)) for transmission to the other terminal device (320) via the network (350). The encoded video data can be transmitted in the form of one or more coded video bitstreams. The terminal device (320) may receive the coded video data from the network (350), decode the coded video data to recover the video pictures and display video pictures according to the recovered video data. Unidirectional data transmission may be common in media serving applications and the like.

In another example, the communication system (300) includes a second pair of terminal devices (330) and (340) that performs bidirectional transmission of coded video data that may occur, for example, during videoconferencing. For bidirectional transmission of data, in an example, each terminal device of the terminal devices (330) and (340) may code video data (e.g., a stream of video pictures that are captured by the terminal device) for transmission to the other terminal device of the terminal devices (330) and (340) via the network (350). Each terminal device of the terminal devices (330) and (340) also may receive the coded video data transmitted by the other terminal device of the terminal devices (330) and (340), and may decode the coded video data to recover the video pictures and may display video pictures at an accessible display device according to the recovered video data.

In the FIG. 3 example, the terminal devices (310), (320), (330) and (340) may be illustrated as servers, personal computers and smart phones but the principles of the present disclosure may be not so limited. Embodiments of the present disclosure find application with laptop computers, tablet computers, media players and/or dedicated video conferencing equipment. The network (350) represents any number of networks that convey coded video data among the terminal devices (310), (320), (330) and (340), including for example wireline (wired) and/or wireless communication networks. The communication network (350) may exchange data in circuit-switched and/or packet-switched channels. Representative networks include telecommunications networks, local area networks, wide area networks and/or the Internet. For the purposes of the present discussion, the architecture and topology of the network (350) may be immaterial to the operation of the present disclosure unless explained herein below.

Figure 4:
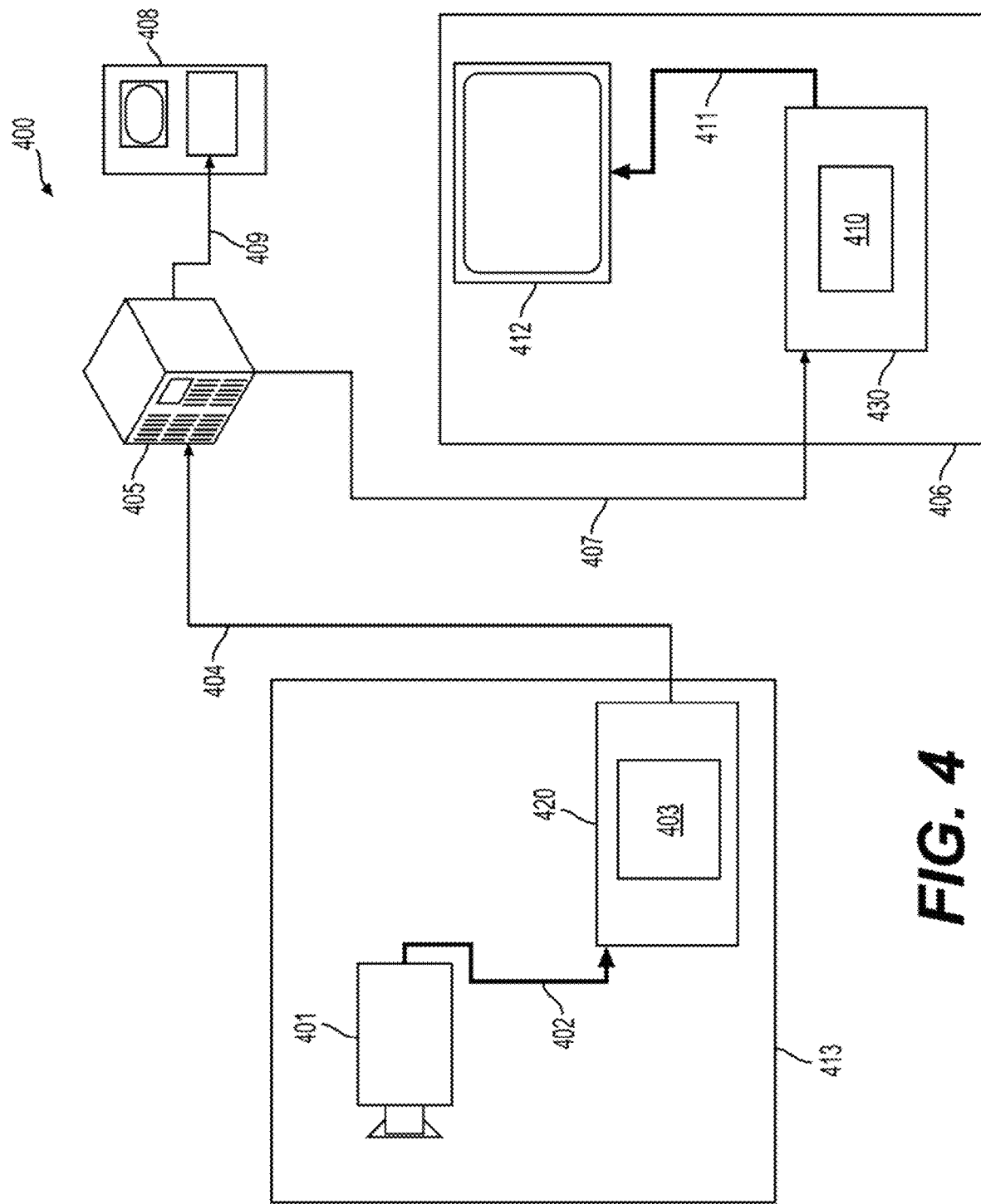
FIG. 4 is a schematic illustration of a simplified block diagram of a communication system (400) in accordance with an embodiment.

FIG. 4 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (413), that can include a video source (401), for example a digital camera, creating for example a stream of video pictures (402) that are uncompressed. In an example, the stream of video pictures (402) includes samples that are taken by the digital camera. The stream of video pictures (402), depicted as a bold line to emphasize a high data volume when compared to encoded video data (404) (or coded video bitstreams), can be processed by an electronic device (420) that includes a video encoder (403) coupled to the video source (401). The video encoder (403) can include hardware, software, or a combination thereof to enable or implement aspects of the disclosed subject matter as described in more detail below. The encoded video data (404) (or encoded video bitstream), depicted as a thin line to emphasize the lower data volume when compared to the stream of video pictures (402), can be stored on a streaming server (405) for future use. One or more streaming client subsystems, such as client subsystems (406) and (408) in FIG. 4 can access the streaming server (405) to retrieve copies (407) and (409) of the encoded video data (404). A client subsystem (406) can include a video decoder (410), for example, in an electronic device (430). The video decoder (410) decodes the incoming copy (407) of the encoded video data and creates an outgoing stream of video pictures (411) that can be rendered on a display (412) (e.g., display screen) or other rendering device (not depicted). In some streaming systems, the encoded video data (404), (407), and (409) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (420) and (430) can include other components (not shown). For example, the electronic device (420) can include a video decoder (not shown) and the electronic device (430) can include a video encoder (not shown) as well.

Figure 5:
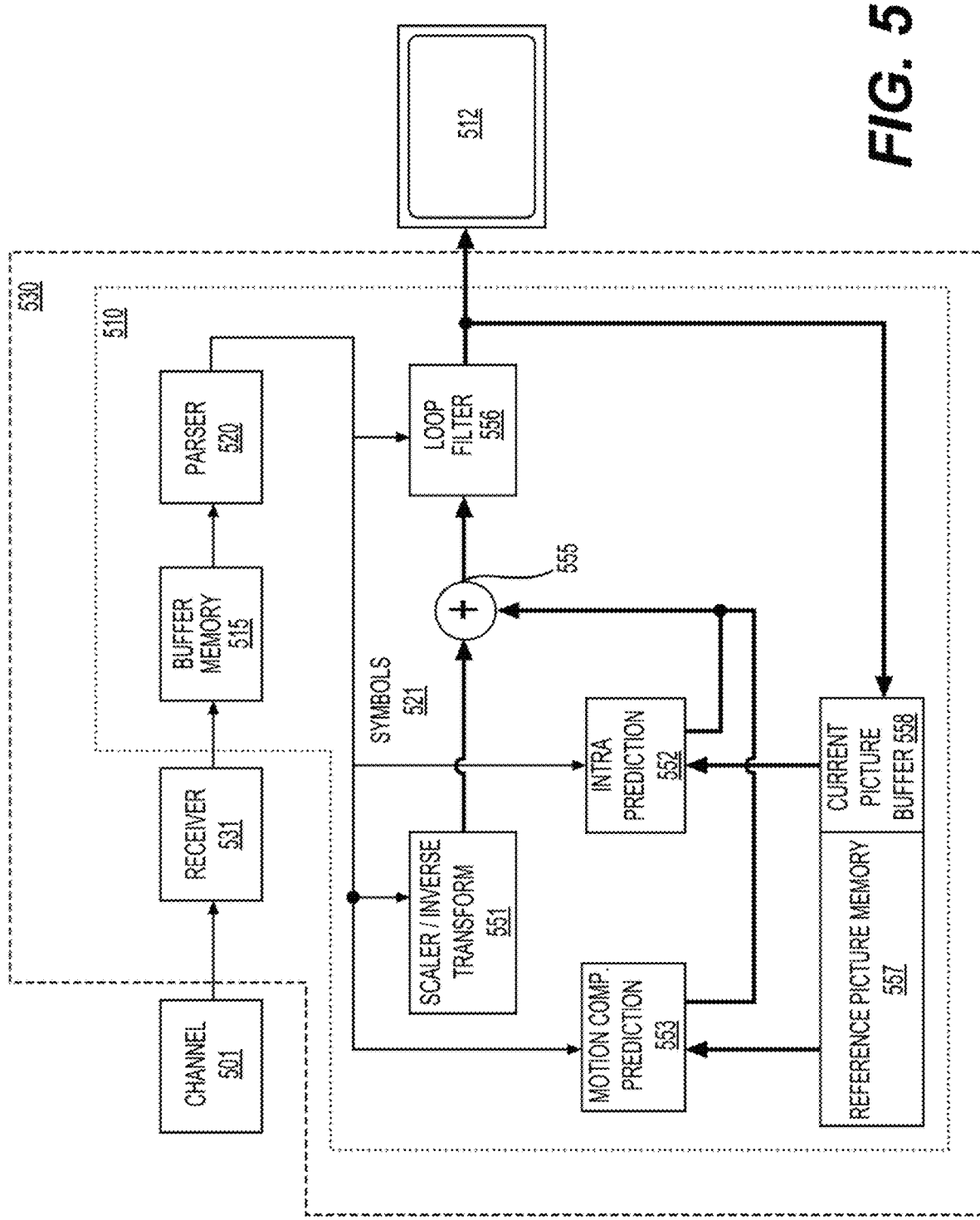
FIG. 5 is a schematic illustration of a simplified block diagram of a decoder in accordance with an embodiment.

FIG. 5 shows a block diagram of a video decoder (510) according to an embodiment of the present disclosure. The video decoder (510) can be included in an electronic device (530). The electronic device (530) can include a receiver (531) (e.g., receiving circuitry). The video decoder (510) can be used in the place of the video decoder (410) in the FIG. 4 example.

The receiver (531) may receive one or more coded video sequences to be decoded by the video decoder (510); in the same or another embodiment, one coded video sequence at a time, where the decoding of each coded video sequence is independent from other coded video sequences. The coded video sequence may be received from a channel (501), which may be a hardware/software link to a storage device which stores the encoded video data. The receiver (531) may receive the encoded video data with other data, for example, coded audio data and/or ancillary data streams, that may be forwarded to their respective using entities (not depicted). The receiver (531) may separate the coded video sequence from the other data. To combat network jitter, a buffer memory (515) may be coupled in between the receiver (531) and an entropy decoder/parser (520) ("parser (520)" henceforth). In certain applications, the buffer memory (515) is part of the video decoder (510). In others, it can be outside of the video decoder (510) (not depicted). In still others, there can be a buffer memory (not depicted) outside of the video decoder (510), for example to combat network jitter, and in addition another buffer memory (515) inside the video decoder (510), for example to handle playout timing. When the receiver (531) is receiving data from a store/forward device of sufficient bandwidth and controllability, or from an isosynchronous network, the buffer memory (515) may not be needed, or can be small. For use on best effort packet networks such as the Internet, the buffer memory (515) may be required, can be comparatively large and can be advantageously of adaptive size, and may at least partially be implemented in an operating system or similar elements (not depicted) outside of the video decoder (510).

The video decoder (510) may include the parser (520) to reconstruct symbols (521) from the coded video sequence. Categories of those symbols include information used to manage operation of the video decoder (510), and potentially information to control a rendering device such as a render device (512) (e.g., a display screen) that is not an integral part of the electronic device (530) but can be coupled to the electronic device (530), as was shown in FIG. 5. The control information for the rendering device(s) may be in the form of Supplemental Enhancement Information (SEI) messages or Video Usability Information (VUI) parameter set fragments (not depicted). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from the buffer memory (515), so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values, that can be input into aggregator (555).

In some cases, the output samples of the scaler/inverse transform unit (551) can pertain to an intra coded block; that is: a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520), but can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to the render device (512) as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (531) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
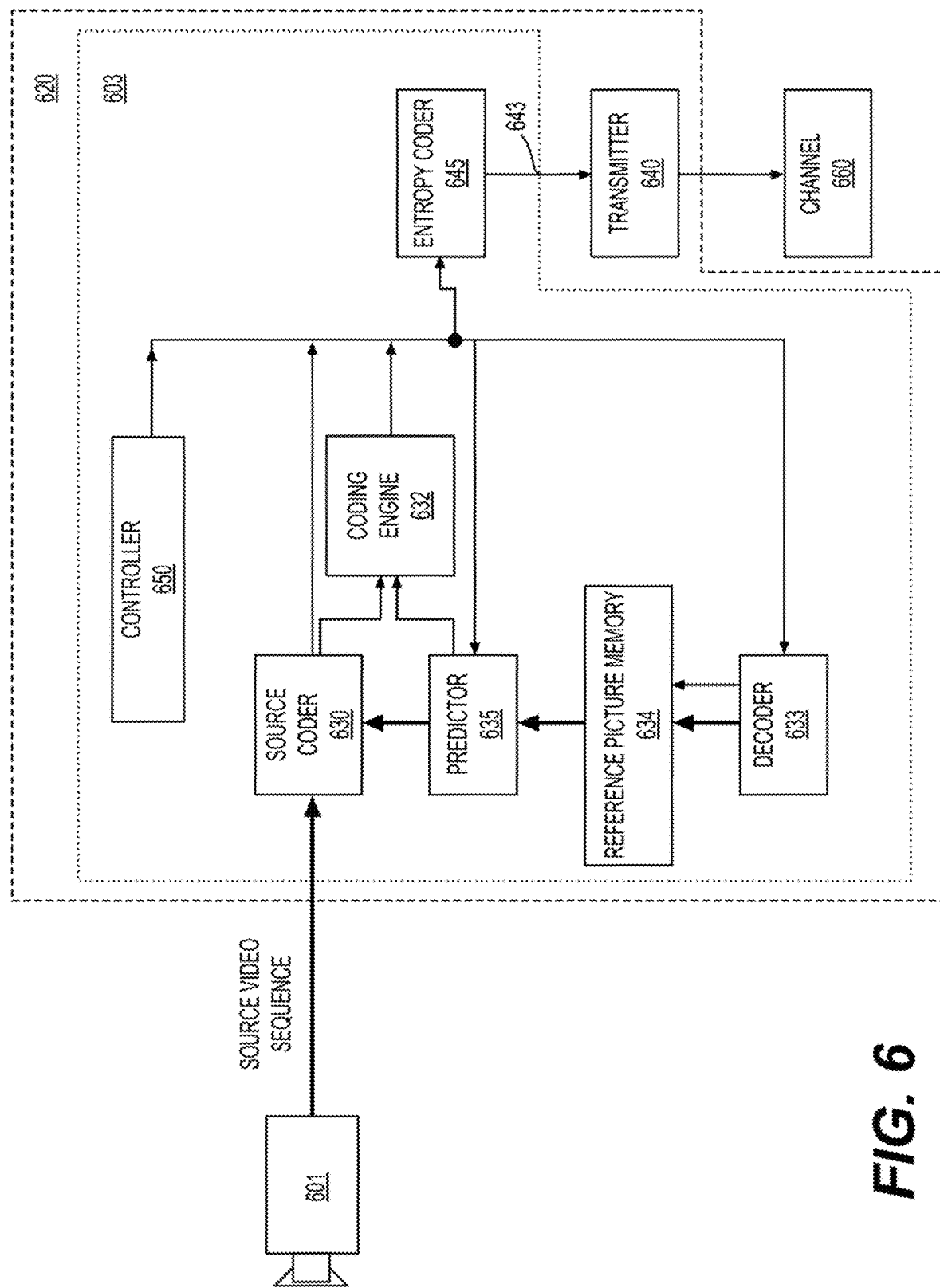
FIG. 6 is a schematic illustration of a simplified block diagram of an encoder in accordance with an embodiment.

FIG. 6 shows a block diagram of a video encoder (603) according to an embodiment of the present disclosure. The video encoder (603) is included in an electronic device (620). The electronic device (620) includes a transmitter (640) (e.g., transmitting circuitry). The video encoder (603) can be used in the place of the video encoder (403) in the FIG. 4 example.

The video encoder (603) may receive video samples from a video source (601) (that is not part of the electronic device (620) in the FIG. 6 example) that may capture video image(s) to be coded by the video encoder (603). In another example, the video source (601) is a part of the electronic device (620).

The video source (601) may provide the source video sequence to be coded by the video encoder (603) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (601) may be a storage device storing previously prepared video. In a videoconferencing system, the video source (601) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (603) may code and compress the pictures of the source video sequence into a coded video sequence (643) in real time or under any other time constraints as required by the application. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including the buffer memory (515), and parser (520) may not be fully implemented in the local decoder (633).

In an embodiment, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (630) may perform motion compensated predictive coding, which codes an input picture predictively with reference to one or more previously coded picture from the video sequence that were designated as "reference pictures." In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture memory (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by losslessly compressing the symbols according to technologies such as Huffman coding, variable length coding, arithmetic coding, and so forth.

The transmitter (640) may buffer the coded video sequence(s) as created by the entropy coder (645) to prepare for transmission via a communication channel (660), which may be a hardware/software link to a storage device which would store the encoded video data. The transmitter (640) may merge coded video data from the video encoder (603) with other data to be transmitted, for example, coded audio data and/or ancillary data streams (sources not shown).

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

In an embodiment, the transmitter (640) may transmit additional data with the encoded video. The source coder (630) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
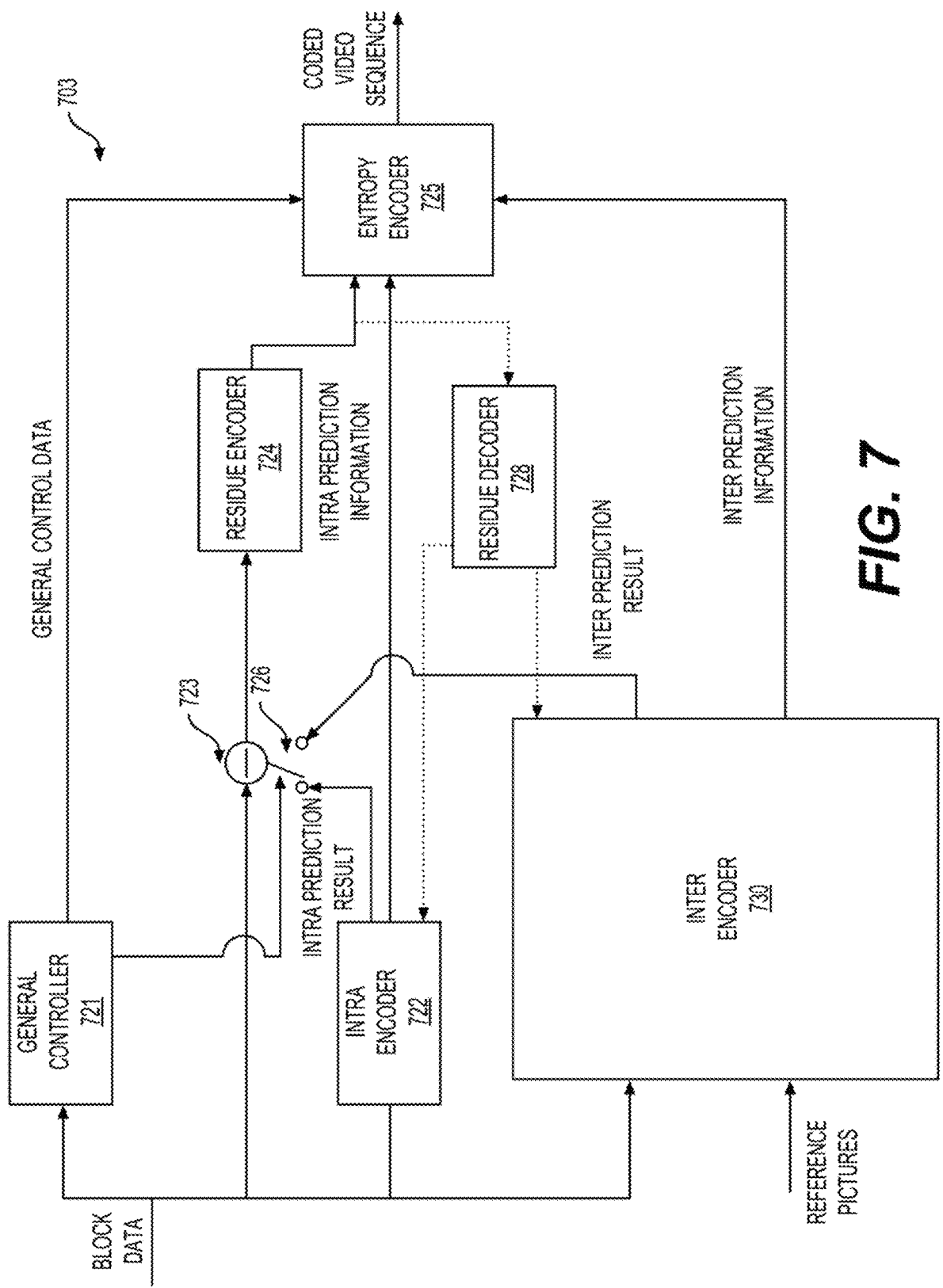
FIG. 7 shows a block diagram of an encoder in accordance with another embodiment.

FIG. 7 shows a diagram of a video encoder (703) according to another embodiment of the disclosure. The video encoder (703) is configured to receive a processing block (e.g., a prediction block) of sample values within a current video picture in a sequence of video pictures, and encode the processing block into a coded picture that is part of a coded video sequence. In an example, the video encoder (703) is used in the place of the video encoder (403) in the FIG. 4 example.

In an HEVC example, the video encoder (703) receives a matrix of sample values for a processing block, such as a prediction block of 8×8 samples, and the like. The video encoder (703) determines whether the processing block is best coded using intra mode, inter mode, or bi-prediction mode using, for example, rate-distortion optimization. When the processing block is to be coded in intra mode, the video encoder (703) may use an intra prediction technique to encode the processing block into the coded picture; and when the processing block is to be coded in inter mode or bi-prediction mode, the video encoder (703) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (703) includes other components, such as a mode decision module (not shown) to determine the mode of the processing blocks.

In the FIG. 7 example, the video encoder (703) includes the inter encoder (730), an intra encoder (722), a residue calculator (723), a switch (726), a residue encoder (724), a general controller (721), and an entropy encoder (725) coupled together as shown in FIG. 7.

The inter encoder (730) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (722) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (722) also calculates intra prediction results (e.g., predicted block) based on the intra prediction information and reference blocks in the same picture.

The general controller (721) is configured to determine general control data and control other components of the video encoder (703) based on the general control data. In an example, the general controller (721) determines the mode of the block, and provides a control signal to the switch (726) based on the mode. For example, when the mode is the intra mode, the general controller (721) controls the switch (726) to select the intra mode result for use by the residue calculator (723), and controls the entropy encoder (725) to select the intra prediction information and include the intra prediction information in the bitstream; and when the mode is the inter mode, the general controller (721) controls the switch (726) to select the inter prediction result for use by the residue calculator (723), and controls the entropy encoder (725) to select the inter prediction information and include the inter prediction information in the bitstream.

The residue calculator (723) is configured to calculate a difference (residue data) between the received block and prediction results selected from the intra encoder (722) or the inter encoder (730). The residue encoder (724) is configured to operate based on the residue data to encode the residue data to generate the transform coefficients. In an example, the residue encoder (724) is configured to convert the residue data from a spatial domain to a frequency domain, and generate the transform coefficients. The transform coefficients are then subject to quantization processing to obtain quantized transform coefficients. In various embodiments, the video encoder (703) also includes a residue decoder (728). The residue decoder (728) is configured to perform inverse-transform, and generate the decoded residue data. The decoded residue data can be suitably used by the intra encoder (722) and the inter encoder (730). For example, the inter encoder (730) can generate decoded blocks based on the decoded residue data and inter prediction information, and the intra encoder (722) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (725) is configured to format the bitstream to include the encoded block. The entropy encoder (725) is configured to include various information according to a suitable standard, such as the HEVC standard. In an example, the entropy encoder (725) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 8:
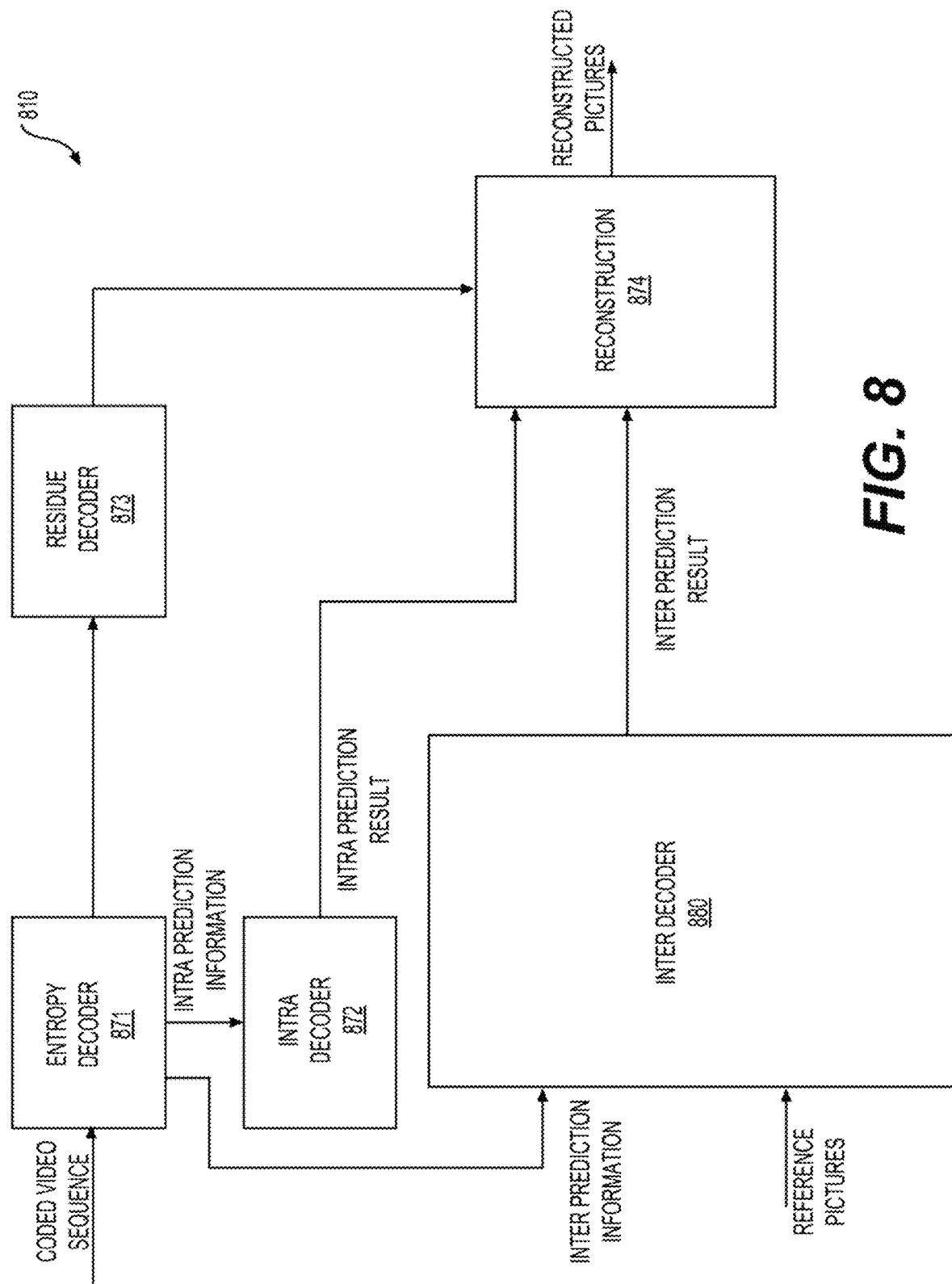
FIG. 8 shows a block diagram of a decoder in accordance with another embodiment.

FIG. 8 shows a diagram of a video decoder (810) according to another embodiment of the disclosure. The video decoder (810) is configured to receive coded pictures that are part of a coded video sequence, and decode the coded pictures to generate reconstructed pictures. In an example, the video decoder (810) is used in the place of the video decoder (410) in the FIG. 4 example.

In the FIG. 8 example, the video decoder (810) includes an entropy decoder (871), an inter decoder (880), a residue decoder (873), a reconstruction module (874), and an intra decoder (872) coupled together as shown in FIG. 8.

The entropy decoder (871) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (872) or the inter decoder (880), respectively, residual information in the form of, for example, quantized transform coefficients, and the like. In an example, when the prediction mode is inter or bi-predicted mode, the inter prediction information is provided to the inter decoder (880); and when the prediction type is the intra prediction type, the intra prediction information is provided to the intra decoder (872). The residual information can be subject to inverse quantization and is provided to the residue decoder (873).

The inter decoder (880) is configured to receive the inter prediction information, and generate inter prediction results based on the inter prediction information.

The intra decoder (872) is configured to receive the intra prediction information, and generate prediction results based on the intra prediction information.

The residue decoder (873) is configured to perform inverse quantization to extract de-quantized transform coefficients, and process the de-quantized transform coefficients to convert the residual from the frequency domain to the spatial domain. The residue decoder (873) may also require certain control information (to include the Quantizer Parameter (QP)), and that information may be provided by the entropy decoder (871) (data path not depicted as this may be low volume control information only).

The reconstruction module (874) is configured to combine, in the spatial domain, the residual as output by the residue decoder (873) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (403), (603), and (703), and the video decoders (410), (510), and (810) can be implemented using any suitable technique. In an embodiment, the video encoders (403), (603), and (703), and the video decoders (410), (510), and (810) can be implemented using one or more integrated circuits. In another embodiment, the video encoders (403), (603), and (603), and the video decoders (410), (510), and (810) can be implemented using one or more processors that execute software instructions.

According to an embodiment of the disclosure, a bitstream can include one or more coded video sequences (CVSs). A CVS can be independently coded from other CVSs. Each CVS can include one or more layers, and each layer can be a representation of a video with a specific quality (e.g., a spatial resolution), or a representation of a certain component interpretation property, e.g., as a depth map, a transparency map, or a perspective view. In a temporal dimension, each CVS can include one or more access units (AUs). Each AU can include one or more pictures of different layers that correspond to a same time instance. A coded layer video sequence (CLVS) is a layer-wise CVS that can include a sequence of picture units in the same layer. If a bitstream has multiple layers, a CVS in the bitstream can have one or more CLVSs for each layer.

In an embodiment, a CVS includes a sequence of AUs where the sequence of AUs includes, in a decoding order, an intra random access point (IRAP) AU, followed by zero or more AUs that are not IRAP AUs. In an example, the zero or more AUs includes all subsequent AUs up to but not including any subsequent AU that is an IRAP AU. In an example, a CLVS includes a sequence of pictures and the associated non-video coding layer (VCL) network abstraction layer (NAL) units of a base layer of a CVS.

According to some aspects of the disclosure, video can be categorized into single view videos and multi-view videos. For example, a single view video (e.g., a monoscopic video) is a two-dimensional medium that provides viewers a single view of a scene. A multi-view video can provide multiple viewpoints of a scene, and can provide viewers the sensation of realism. In an example, a 3D video can provide two views, such as a left view and a right view corresponding to a human viewer. The two views may be displayed (presented) simultaneously or near simultaneously using different polarizations of light, and a viewer may wear polarized glasses such that each of the viewer's eyes receives a respective one of the views.

This disclosure includes embodiments related to efficient coding and representations of multiple views. The disclosure includes features-based multi-view representation and delivery. In an embodiment, contents of each view (or each picture) can be extracted and represented using feature information indicating features and/or key points. The features of different views at a same time, or time instance, can be prioritized to enable scalability of a view access.

Multiple views can be used in video capture and coding. To enrich a visual experience of a user, a scene of interest can be captured by using multiple cameras from different locations, as shown in FIGS. 9A-9B for example.

Figure 9A:
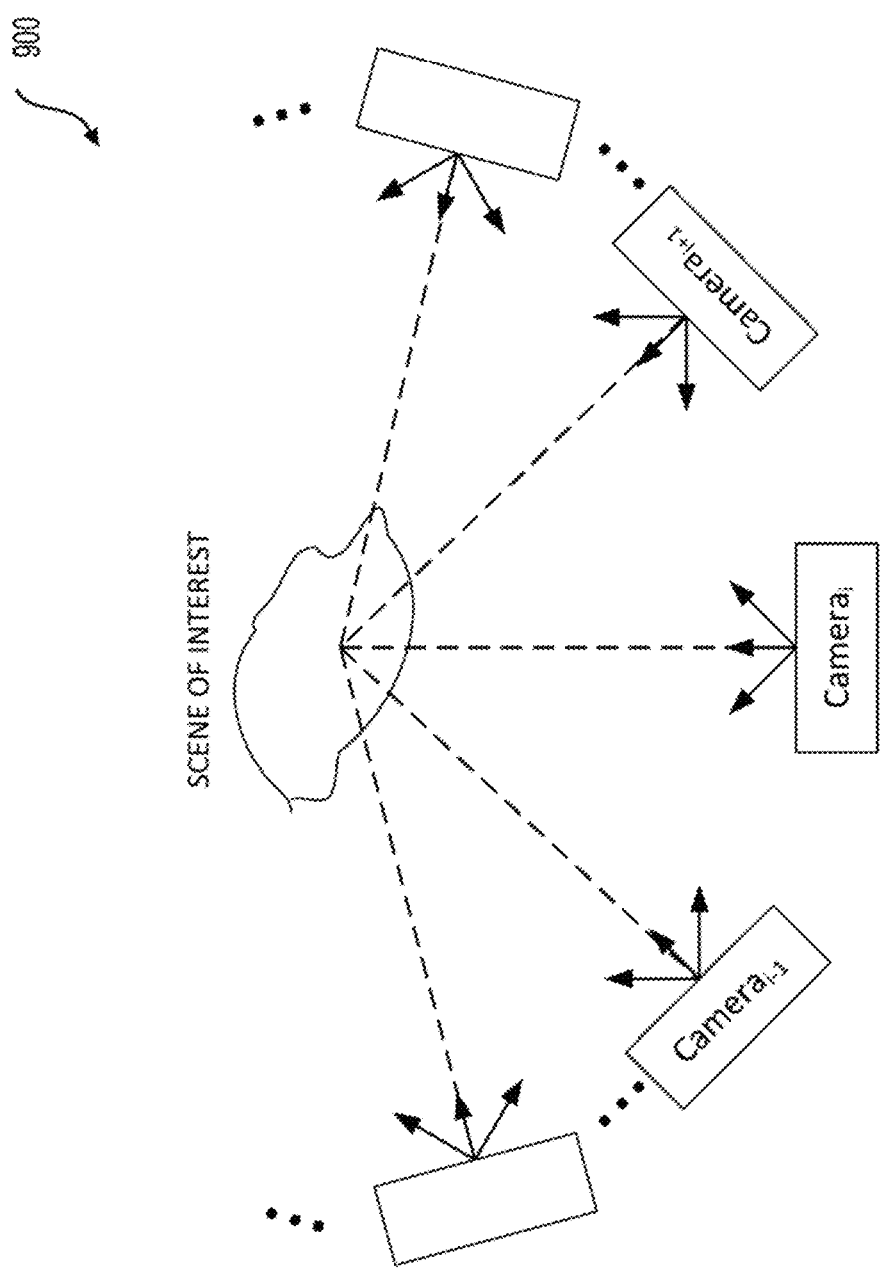
FIG. 9A shows an exemplary arrangement of cameras in a multi-camera capturing system according to an embodiment of the disclosure.

FIG. 9A shows an exemplary arch arrangement of cameras in a multi-camera capturing system according to an embodiment of the disclosure. The cameras (e.g., indicated by i−1, i, i+1) are arranged around a 1-dimensional (1D) arch shape. A distance between the cameras and the scene of interest can be identical or different.

Figure 9B:
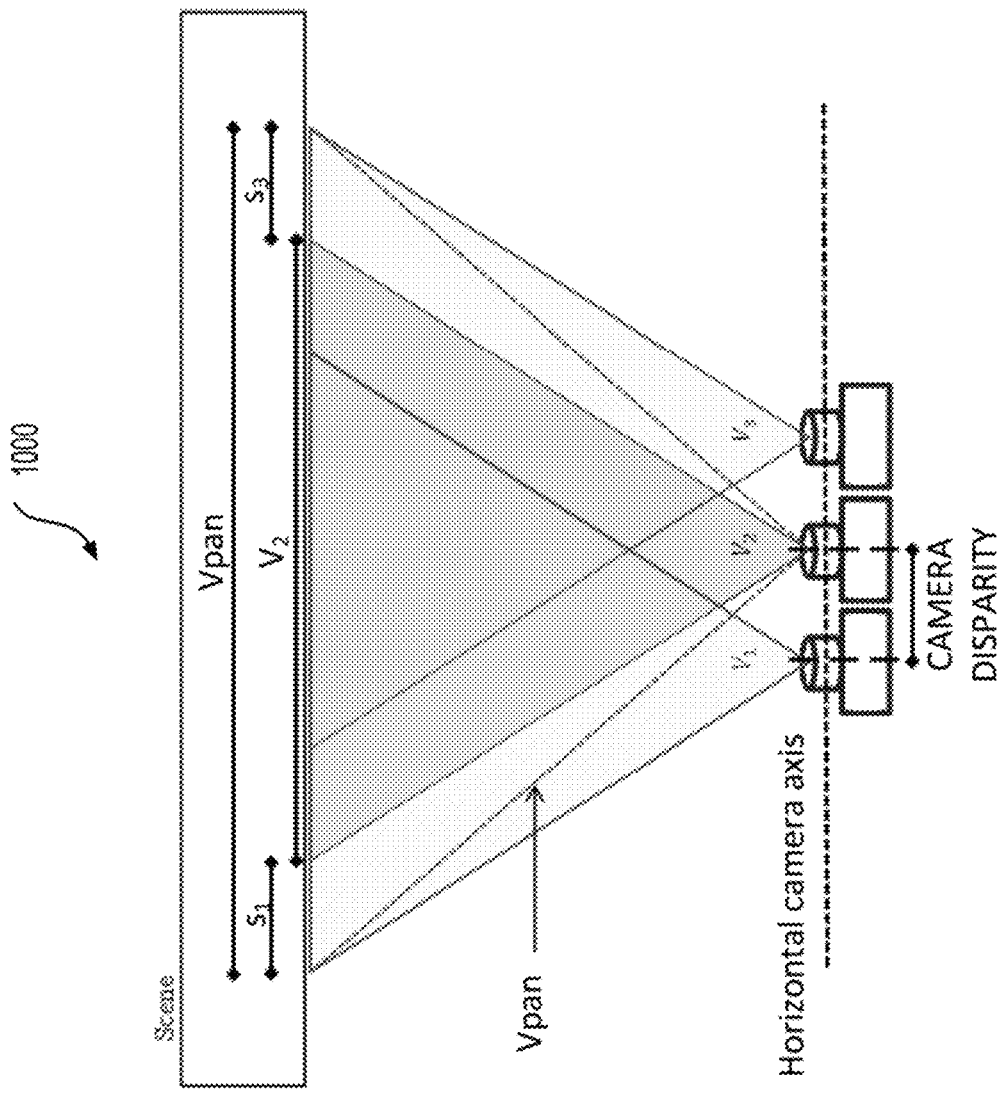
FIG. 9B shows an exemplary 1D parallel arrangement of cameras in a multi-camera capturing system according to an embodiment of the disclosure.

FIG. 9B shows an exemplary 1D parallel arrangement of cameras in a multi-camera capturing system according to an embodiment of the disclosure. The cameras (e.g., 1-3) are arranged along a 1D axis (e.g., a horizontal camera axis). In an example, adjacent cameras are separated by a distance (e.g., camera disparity). A distance between the cameras and the scene of interest can be identical or different. Symbols $v_1$, $v_2$, and $v_3$ indicate respective views corresponding to the cameras 1, 2, and 3. A panorama view $V_{pan}$ can include the views $v_1$-$v_3$.

Multiple cameras applications can include a VR video or VR360, free-view (e.g., free viewpoint television (FTV)), a light field video, and the like. A VR video can also be referred to as 360 VR or VR360. A VR360 can refer to videos that are captured using an omnidirectional camera. An omnidirectional camera can enable the filming in 360 degrees, or a portion thereof, at the same time. In a VR video, a user can look around an entire scene. Compared to regular videos, VR videos can provide a more immersive and interactive experience.

Free viewpoint television (FTV) can include a system for viewing natural video, allowing a user to interactively control a viewpoint and generate new views of a dynamic scene from a 3D position. With FTV, the focus of attention can be controlled by viewers rather than a director where each viewer may be observing a unique viewpoint.

A light field video can be captured by a light field camera or a plenoptic camera. Certain cameras record only light intensity from a scene. A light field camera or a plenoptic camera can record the light field. A light field video can include information about the light field emanating from a scene, such as an intensity of light in the scene, and a direction that the light rays are traveling in space. A light field video can include the intensity of light in the scene, and the direction that the light rays are traveling in space.

Multi-camera arrays such as shown in FIGS. 9A-9B can capture VR360, FTV, a light field video, and the like.

As described in FIGS. 9A-9B, a multi-view video can be created by capturing a scene using multiple cameras simultaneously, where the multiple cameras are properly located so that each camera captures the scene from a respective viewpoint. The multiple cameras can capture multiple video sequences corresponding to multiple viewpoints. To provide more views, more cameras can be used to generate a multi-view video with a large number of video sequences associated with the views. The multi-view video may require a large storage space for storage and/or a high bandwidth for transmission. Multi-view video coding techniques have been developed in the field to reduce the required storage space or the transmission bandwidth.

To improve efficiency of multi-view video coding, similarities between views can be exploited. In some embodiments, one of the views that is referred to as a base view, is encoded like a monoscopic video. For example, during the encoding of the base view, the intra(picture) and/or temporal inter(picture) predictions are used. The base view may be decoded using a monoscopic decoder (e.g., a monoscopic decoder) that performs intra(picture) prediction and the inter(picture) prediction. Other views beside the base view in the multi-view video can be referred to as dependent views. To code the dependent views, in addition to intra (picture) and inter(picture) predictions, the inter-view prediction with disparity compensation may be used. In an example, in an inter-view prediction, a current block in a dependent view is predicted using a reference block of samples from a picture of another view in the same time instance. The location of the reference block is indicated by a disparity vector. The inter-view prediction is similar to the inter(picture) prediction except that the motion vectors are replaced by the disparity vectors, and the temporal reference pictures are replaced by the reference pictures from other views.

According to some aspects of the disclosure, multi-view coding can employ a multi-layer approach. The multi-layer approach can multiplex different coded (e.g., HEVC-coded) representations of video sequences, called layers, into one bitstream. The layers can depend on each other. Dependencies can be used by inter-layer prediction to achieve increased compression performance by exploiting similarities among different layers. A layer can represent texture, depth or other auxiliary information of a scene related to a particular camera perspective. In some examples, all layers belonging to the same camera perspective are denoted as a view; and layers carrying the same type of information (e.g., texture or depth) are called components in the scope of multi-view video.

According to an aspect of the disclosure, the multi-view video coding can include high-level syntax (HLS) (e.g., higher than a slice level) additions with existing single layer decoding cores. In some examples, the multi-view view coding does not change the syntax or decoding process required for (e.g., HEVC) single-layer coding below the slice level. Re-use of existing implementations without major changes for building multi-view video decoders can be allowed. For example, a multi-view video decoder can be implemented based on the video decoder (510) or the video decoder (810).

In some examples, all pictures associated with the same capture or display time instance are contained in an AU and have the same picture order count (POC). The multi-view video coding can allow inter-view prediction that performs prediction from pictures in the same AU. For example, the decoded pictures from other views can be inserted into one or both of the reference picture lists of a current picture. Further, in some examples, the motion vectors may be actual temporal motion vectors when related to temporal reference pictures of the same view, or may be disparity vectors when related to inter-view reference pictures. Block-level motion compensation modules (e.g., block level encoding software or hardware, block level decoding software or hardware) can be used which operate the same way regardless of whether a motion vector is a temporal motion vector or a disparity vector.

After being captured, information in the multiple views (multi-view) can be processed, compressed, delivered to a client end, and/or stored. A video of each view can be regarded as a 2D video (e.g., a monoscopic video), and can be efficiently coded (e.g., compressed) using video/image coding technologies (e.g., the intra(picture) and/or temporal inter(picture) predictions) described above, such as HEVC, VVC, and the like. Certain applications, such as VR360, FTV, a light field video described above, can impose a relatively high bandwidth requirement due to a large number of views in a video. Various technologies can be used to alleviate the bandwidth burden.

As described above, inter-view dependence across different views can be explored. A subset of views of all the views can be coded first. Contents of the coded subset of views can be used as a reference for other views to be coded, such as in the inter-view prediction with disparity compensation. The other views can be compressed more efficiently when compared to coding the other views independently.

In an embodiment, a subset of views of all views can be selected for coding/compression. Other views (referred to as not-coded views) are not provided (e.g., transmitted) to reduce the bandwidth requirement and do not need to be coded/compressed. From a client end, the received bitstream only contains a fraction (e.g., the subset of views) of all the captured views. If contents of the not-coded views, or other intermediate virtual (non-existing) views are to be accessed (e.g., consumed), the not-coded views and/or non-existing views can be rendered by using information from neighboring view(s). The not-coded views can be captured by one or more camera(s) but not coded and not transmitted. The non-existing views are views not captured by the camera(s). In an example, depth information (e.g., a distance between a scene of interest and a camera that records the scene of interest) associated with views is used for intermediate view rendering.

Figure 10:
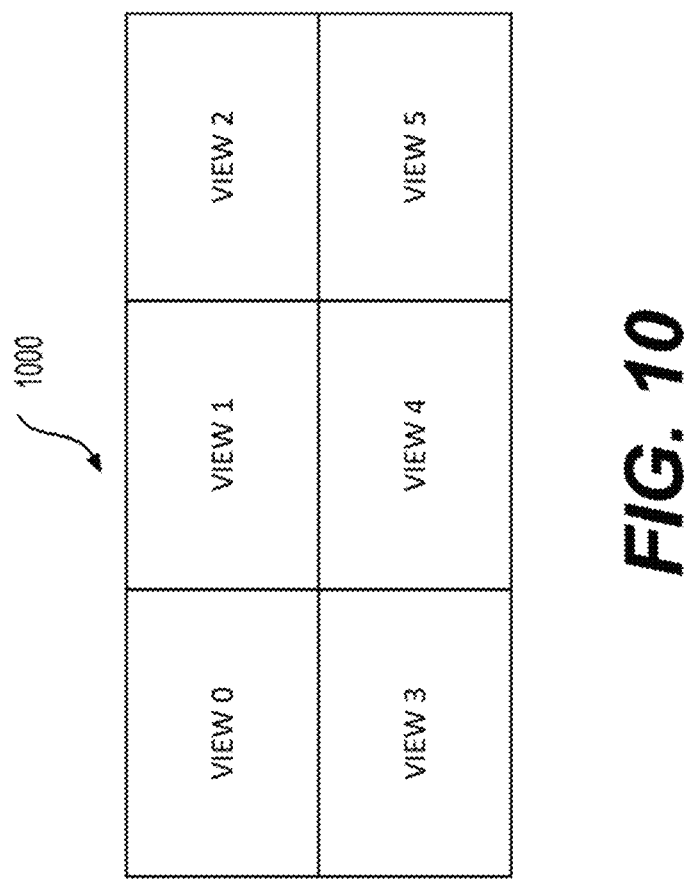
FIG. 10 shows an example of spatial stitching according to an embodiment of the disclosure.

In an embodiment, spatial stitching can be performed where selected views to be coded are stitched together into a larger video. FIG. 10 shows an example of spatial stitching according to an embodiment of the disclosure. Six to-be-coded views (e.g., views 0-5) can be spatially stitched into a video (1000), for example, with a 3×2 setup. A resolution of the larger video (1000) is 3 times of each of the views 0-5 horizontally and 2 times of each of the views 0-5 vertically. The single video (1000) can be coded (e.g., encoded and/or decoded) using related video coding methods for a 2D video (e.g., a monoscopic video), for example, including video/image coding technologies (e.g., the intra(picture) and/or temporal inter(picture) predictions) described above, such as HEVC, VVC, and the like. After the video (1000) is decoded, individual views (e.g., views 0-5) can be extracted from the larger video (1000).

In an embodiment, temporal stacking can be performed. Pictures of different views that correspond to a same time instance can be coded sequentially, using one or more pictures as base view(s) with only intra prediction while other pictures can refer to the coded one or more pictures with inter picture prediction. After coding views of a first time instance, similar operations can apply to pictures of views at a different time instance. For example, until all pictures of a certain time instance are coded sequentially, pictures of another time instance are not processed. The method described above can be referred to as a "time first" coding approach. In an example, all pictures of a same time instance are processed before pictures of another time instance are coded.

In various examples, coding of multiple views, such as with the above coding methods, can be challenging due to a total bandwidth consumption. In some applications, a user views only a fraction of all view angles or viewpoints at a time. What the user can see in a reconstructed scene can be defined as a view port. In an embodiment, a user can define a view port. The view port can have any suitable shape, such as a rectangular shape. A current view port can change to another view port, and the user can change views. If the user does not switch to other view ports, data not related to reconstruction of the current view port may not be transmitted. In an example, the server only needs to deliver the part of the multi-view video data corresponding to the current view port. The server may not need to deliver data that does not correspond to the current view port.

According to an embodiment of the disclosure, feature-based video coding (or a feature-based video coding process) can be applied to selected applications, for example, when contents across different pictures do not change significantly. In some selected applications, such as in a video conferencing scenario, contents, such as a human face, a shoulder of a person, and background, across different pictures do not change significantly. Feature-based video coding can be applied to selected applications, for example, when to some extent, smoothness of a playback and/or a subjective quality of a video is more important than high fidelity relative to an original content. For example, in some video conferencing scenarios, smoothness of a playback and/or a subjective quality of a video is more important than high fidelity relative to an original content.

In the disclosure, a key picture can refer to a picture whose samples (or pixels) are coded (e.g., encoded and decoded), for example, using video/image coding technologies of HEVC and/or VVC, including the intra(picture) and/or temporal inter(picture) predictions described in FIGS. 1A, 1B, and 2-8.

A non-key picture refers to a picture whose samples are not coded directly. For a non-key picture, feature information or a feature change of the non-key picture with respect to another picture (e.g., a key picture) can be coded (e.g., encoded and decoded).

In a feature-based video coding process, feature information of a content of a picture can be determined (e.g., extracted) from the picture. The feature information can indicate feature(s) of the content of the picture, key points of the content of the picture, and/or the like. The process to determine (e.g., extract) the feature information (e.g., the features and/or key points) can be referred to as a feature extraction process. The content (or characteristics of the content) of the picture can be represented or rendered by the feature information, for example, including extracted features and/or key points of the picture. In an embodiment, the feature information indicates feature(s) and/or key points in the picture that are likely to change. When contents across different pictures of a view do not change significantly, the feature information may not include information of a portion of a picture that does not change significantly, for example, to improve coding efficiency without sacrificing the visual quality.

For example, in a video conference application, a picture includes a human (e.g., with a face and an upper torso) and a background, feature information can represent a content related to the human face and does not represent a content related to the background and the upper torso, for example, when the upper torso does not change significantly.

A human face includes components that are common to different people in different pictures/videos, such as eyes, a nose, a mouth, chin, ears, and the like. Differences in shapes, sizes, and structures of the components can distinguish one face from another face. Feature information can include features, such as shapes and sizes of the components and/or arrangements (e.g., relative distances between two components or positions of components on the human face) of the components. The picture can be determined based on the feature information of the human face and additional information (e.g., a background in the picture). The additional information can be determined based on another decoded picture (e.g., a decoded key picture).

A key point (or a keypoint) can refer to a critical location in a picture and can be used to represent a structure of the content (e.g., a human face or components in a human face) in the picture. In some examples, characteristics of the components can be determined based on key points of a face. In an example, in a 9-key point model of a human face, key points describing a human face include two key points indicating locations of two eyeballs, four key points indicating near and far corners of two eyes, a key point indicating a midpoint of nostrils, and two key points indicating two mouth corners. The 9-key point model can be adapted, for example, to include additional key points (e.g., key points to describe locations of ears, eyebrows) to have a more accurate description of the features in a human face. In some examples, a model including a number of key points and locations of the key points is learned or otherwise determined, for example, using a neural network.

In an example, such as in video conferencing, pictures in a video include a human face that changes from a picture to another picture and a background that remains relatively constant. The feature information can include key points, for example, including the key points in the 9-key point model, and/or features associated with respective key points. For example, two key points indicating two mouth corners are included and a feature indicating a mouth shape/structure, such as an open mouth, a closed mouth, can be extracted from a picture. In an example, only the key points are extracted. Features associated with certain key point(s) can be determined based on (i) the key points and (ii) a different picture (e.g., a key picture) or feature information of the different picture.

A feature difference or a feature change of a current picture can indicate a change or difference between feature information of the current picture and feature information of another picture (e.g., a key picture). A feature change can be related to position changes, orientation changes (e.g., in a 3-D space), feature size changes, and the like of the feature information. For example, coordinates of one or more key points in the 9-key point model can change. The feature information of the current picture can be determined based on the feature change of the current picture and the feature information of the other picture (e.g., the key picture).

Figure 11A:
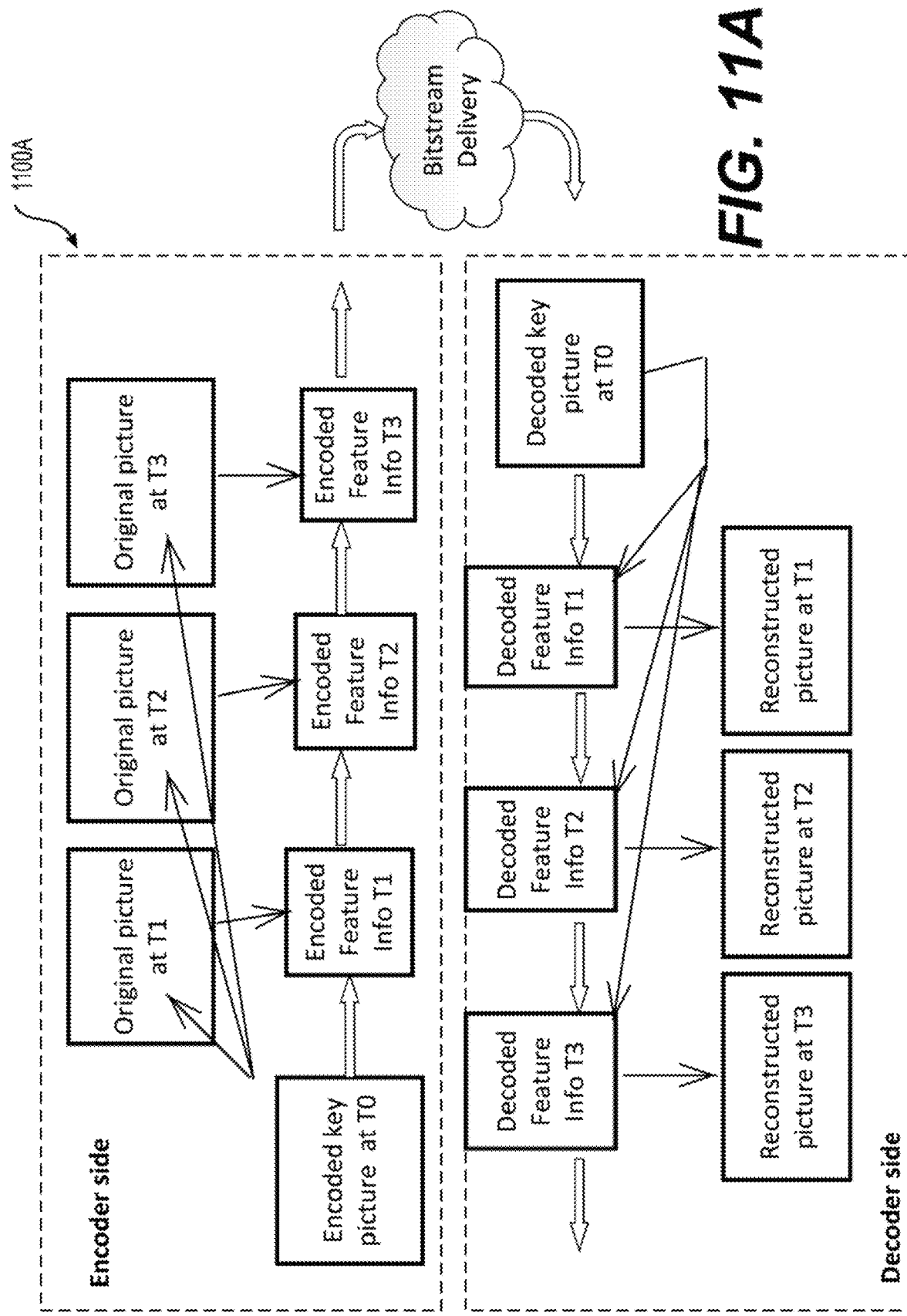
FIG. 11A shows an exemplary schematic diagram of feature-based video coding or a feature-based video coding process.

FIG. 11A shows a schematic diagram of feature-based video coding or a feature-based video coding process (1100A). In an example, a video includes pictures of a view. The feature-based video coding process (1100A) can be applied to code the pictures of the single view. The pictures can include a key picture (e.g., at a time instance T0) and non-key pictures (e.g., original pictures at time instances T1-T3). The video data incudes data of the key picture and data of the non-key pictures. At an encoder side (on top), some part (e.g., the data of the key picture) of the video data can be compressed (e.g., encoded) using methods for a monoscopic video, such as video/image coding technologies (e.g., the intra(picture) and/or temporal inter(picture) predictions) described above (e.g., image/video coding technologies of HEVC and/or VVC). Remaining data (e.g., data of the non-key pictures at T1-T3) can be represented by corresponding feature information at T1-T3, respectively. The feature information at T1-T3 can be encoded. In an example, samples or pixels of the non-key pictures at T1-T3 are not encoded using methods for a monoscopic video, such as video/image coding technologies (e.g., the intra(picture) and/or temporal inter(picture) predictions) described above (e.g., image/video coding technologies of HEVC and/or VVC).

Referring to FIG. 11A, the key picture at T0 is encoded as described above. A feature extraction process can be performed on the key picture at T0 to determine the feature information of the key picture at T0. The feature information of the rest (e.g., the data of the non-key pictures at T1-T3) of the video data can be determined. In an example, the feature extraction process can be performed on the non-key pictures at T1-T3 against the key picture. For the non-key pictures at T1-T3, contents of the original pictures at T1-T3 can be represented or rendered by using the extracted feature information including the features and/or key points, respectively, with corresponding adjustments. For examples, the feature information at T1, T2, and T3 corresponding to the original pictures at T1, T2, and T3 can be encoded into the bitstream. In an example, the encoded bitstream includes the encoded key picture at T0 and the encoded feature information at T1-T3.

At a decoder side (bottom), the encoded key picture data at T0 can be decoded by methods for a monoscopic video, such as video/image coding technologies (e.g., the intra (picture) and/or temporal inter(picture) predictions) described above (e.g., image/video coding technologies of HEVC and/or VVC). In an example, the feature information (e.g., the features and/or the key points) of the key picture at T0 is extracted, in a same way as performed at the encoder side. For additional pictures (e.g., the pictures at T1-T3) following the key picture, the encoded feature information indicating the features and/or key points at T1-T3 can be decoded. When the feature information (e.g., the features and/or key points) is ready (e.g., being decoded) for a particular picture (e.g., the picture at T1), the corresponding picture data at the same time instance (e.g., T1) can be recovered, reconstructed, or rendered based on the decoded feature information at the time instance (e.g., T1) and the already decoded key picture at T0. In an example, the picture at T1 is reconstructed by combining the decoded feature information at the time instance (e.g., T1) and the already decoded key picture at T0.

Figure 11B:
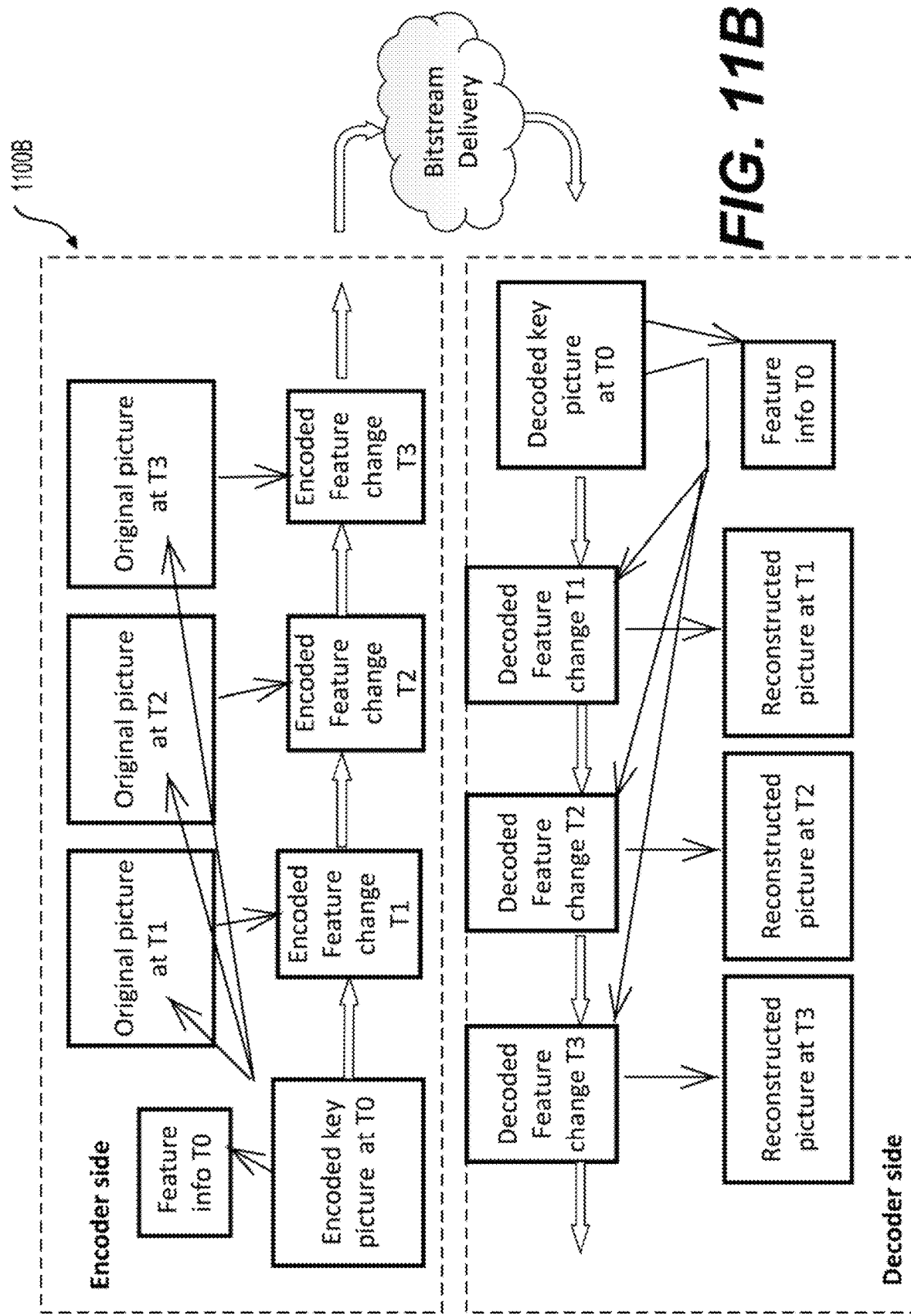
FIG. 11B shows an exemplary schematic diagram of feature-based video coding or a feature-based video coding process.

The above description of a feature-based coding process can be suitably adapted when a feature change or a feature difference is coded (e.g., encoded and/or decoded), as shown in FIG. 11B. Referring to FIG. 11B, a feature change of a current picture at a time instance (e.g., the original picture at T2) can indicate a difference between feature information of another picture (e.g., the key picture at T0 or a non-key picture) and the feature information of the current picture at the time instance (e.g., T2). A feature change can indicate position changes, orientation changes (e.g., in a 3-D space), feature size changes, shape changes, and the like of the features and/or key points from the other picture (e.g., the key picture at T0) to the current picture. For example, the feature change includes coordinate change(s) of one or more key points in the 9-key point model, for example, due to an expression change (e.g., mouth closing or opening) of a human face.

According to an embodiment of the disclosure, feature changes of different pictures in a video can refer to feature changes of the different pictures with respect to a single picture (e.g., a picture used as a feature reference), such as the key picture at T0. For example, the feature changes of the pictures at T1-T3 are with respect to the same key picture at T0.

According to an embodiment of the disclosure, feature changes of different pictures in a video can refer to feature changes of the different pictures with respect to respective pictures used as feature references. The feature references can include more than one picture and can be different for the different pictures. For example, the feature change at a time instance indicates a feature change between the current picture at the time instance and another picture at an adjacent time instance (or at a time instance that is not adjacent). In an example, the feature change of the picture at T1 is with respect to the picture (e.g., the key picture) at T0, the feature change of the picture at T2 is with respect to the picture at T1, and the feature change of the picture at T3 is with respect to the picture at T2.

FIG. 11B shows a schematic diagram of feature-based video coding or a feature-based video coding process (1100B). As described in FIG. 11A, the video includes the pictures of the view. The feature-based video coding process (1100B) can be applied to code the pictures of the single view. The pictures can include the key picture (e.g., at T0) and the non-key pictures (e.g., the original pictures at T1-T3). The video data incudes data of the key picture and data of the non-key pictures. At the encoder side (on top), the data of the key picture at T0 can be compressed as described in FIG. 11A. The feature information of the key picture at T0 can be extracted from the key picture.

In the example shown in FIG. 11B, feature changes of different pictures refer to feature changes of the different pictures with respect to another picture (e.g., the key picture at T0). The feature change of the original picture at T1 can indicate a change between the key picture and the original picture at T1. In an example, the feature change at T1 is a feature change of the original picture at T1 against the key picture. The feature change at T1 can be determined based on the feature information of the key picture and the original picture at T1, for example, without determining the feature information of the original picture at T1. The feature change at T1 can be determined based on the feature information of the key picture and the feature information of the original picture at T1. Similarly, feature changes of the original pictures at T2-T3 can be extracted, for example, based on the original pictures at T2-T3 and the key picture.

Referring to FIG. 11B, the changes (or the feature changes) to established features (e.g., indicated by the feature information of the key picture at T0) can be coded (e.g., encoded) into the bitstream. In an example, the encoded bitstream includes the encoded key picture at T0 and the encoded feature changes at T1-T3.

At the decoder side (at bottom), the key picture data can be decoded by methods similar to the methods described in FIG. 11A. The encoded feature changes (e.g., changes to the established features of the key picture at T0) at T1-T3 can be decoded to recover the corresponding feature information that indicates the features and/or key points of the pictures at T1-T3. In an example, the feature information of the key picture at T0 is decoded. The feature information that indicates the features and/or key points of the pictures at T1-T3, respectively, can be determined based on the corresponding decoded feature changes at T1-T3 and the feature information of the key picture.

When the feature information is decoded for a particular picture (e.g., the picture at T1), the corresponding picture data at the same time instance (e.g., T1) can be recovered, reconstructed, or rendered. The encoded picture can be decoded based on the decoded feature information of the picture at the same time instance and the already decoded key picture.

A feature-based video coding process, such as (1100A) or (1100B), can include a feature-based video encoding (or compression) process and a feature-based video decoding process (e.g., including feature-based rendering and/or reconstruction).

In an example, when the certain conditions are met, the feature-based coding process (1100A) or (1100B) may be more advantageous than related video coding technologies in selected applications. Two exemplary conditions are: (i) a bitrate cost for coding features is smaller than coding original video data; and (ii) a reconstructed visual quality of the feature-based video coding is subjectively acceptable. In some examples, the feature rendered picture does not necessarily need to match the original picture or have high subjective quality, such as being evaluated by a peak signal-to-noise ratio (PSNR) and a structural similarity index (SSIM).

In the feature-based coding process, feature information of content in a picture can be extracted from the picture. The feature information can be used to represent the picture. The feature information or a feature change of the picture instead of samples (or pixels) in the picture can be coded.

The feature information does not need to include information of a portion of the picture that does not change significantly. Thus, in some examples, when contents across different pictures of a view do not change significantly, the feature information may only include information of a relatively small portion of a picture. The feature change may only include the feature change of a relatively small portion of a picture. Information (or the feature change) of a relatively large portion of the picture, such as a background or other parts of a human body, may not be included in the encoded feature information. Coding efficiency can be improved without sacrificing the visual quality.

The above descriptions in FIGS. 11A-11B can be applied to feature-based coding of pictures of a single view. According to an embodiment of the disclosure, feature-based video coding can be used to code a video having multiple views. The disclosure includes embodiments to determine (e.g., define) features in a multi-view context. The term "feature" in the disclosure can be used in methods using key points (or keypoints) for video coding and reconstruction.

Figure 12:
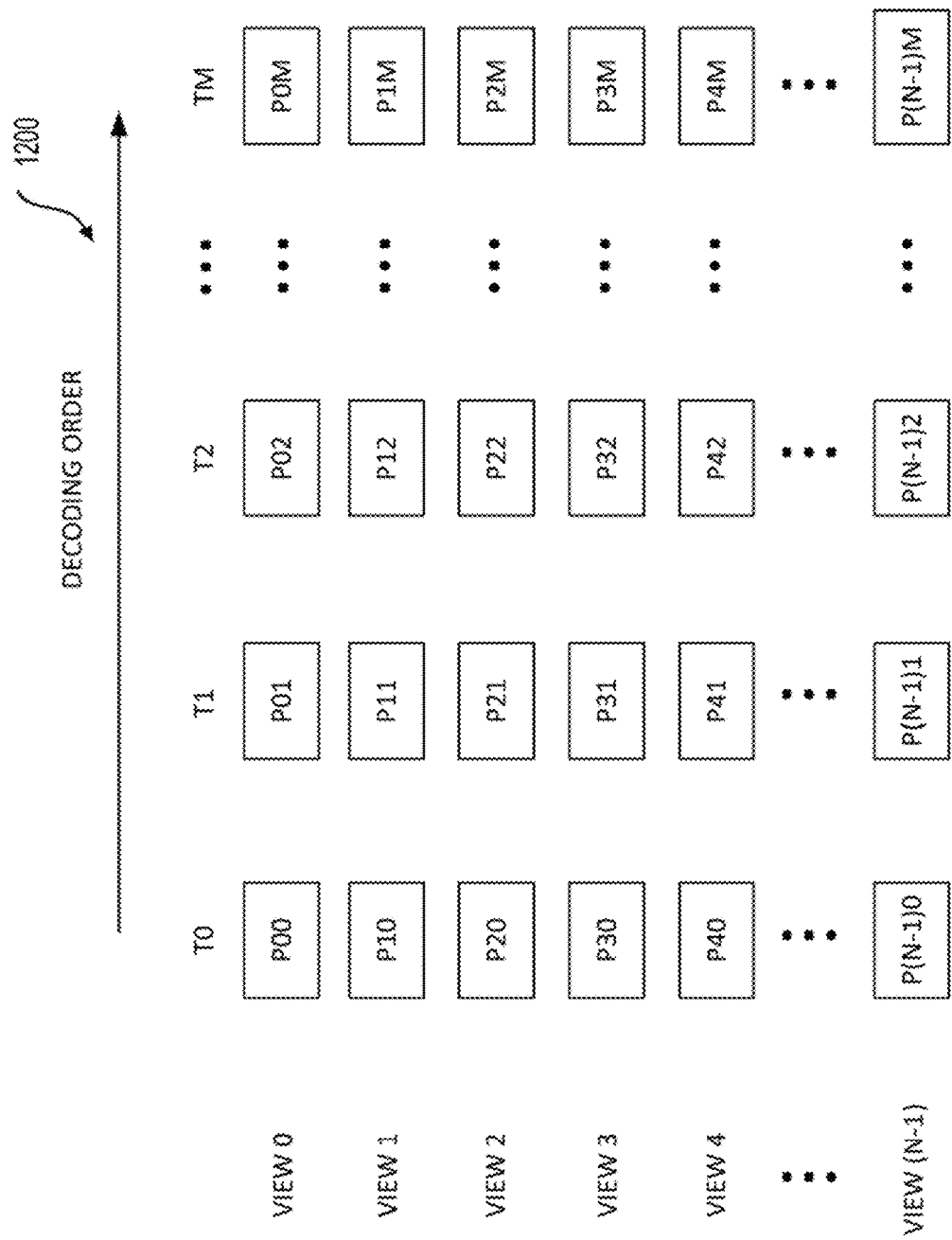
FIG. 12 shows an example of pictures in a bitstream according to an embodiment of the disclosure.

FIG. 12 shows an example of pictures in a bitstream (1200) according to an embodiment of the disclosure. The bitstream (1200) can include pictures of one or more views (e.g., views 0-(N−1)) where N is a positive integer indicating a number of views in the bitstream (1200). When N is 1, the bitstream (1200) is a single view bitstream including a picture of a single view (e.g., view 0). When N is larger than 1, the bitstream (1200) is a multi-view bitstream including picture of different views 0-(N−1). For each view, pictures at (M+1) time instances T0-TM are shown in FIG. 12.

A picture in the bitstream (1200) can be referred to as a picture PIJ. I represents a view I and is from 0 to (N−1). Any suitable number of views can be included in the bitstream (1200). J represents a time instance J and is from 0 to M. Any suitable number of pictures can be included in a view of the bitstream (1200). For example, the picture P32 refers to a picture at T2 of the view 3. In an example, the time instances T0-TM indicate a decoding order. For example, the picture PI(J−1) (e.g., P31) is decoded prior to decoding the picture PIJ (e.g., P32).

In an example, picture of a view is acquired by a camera. Pictures of another view is acquired by another camera. For example, N cameras can be used to acquire the pictures of the views 0-(N−1). The multi-camera systems shown in FIGS. 9A-9B can be used to acquire the pictures of the views 0-(N−1).

The picture of one view (e.g., view 0) can be coded independently from the picture of another view (e.g., view 1). The pictures of each view (e.g., P00-P0M) can be coded (e.g., encoded and/or decoded) based on the feature-based coding process (1100A) or (1100B).

As described above, inter-view dependence across different views can be explored for more efficient video/image coding. The inter-view dependence can be used to determine feature information of key pictures of different views. The inter-view dependence can be used to code a non-key picture based on the feature information of the key pictures of the different views. The inter-view dependence can be used to code a non-key picture of a first view (e.g., view 1) based on another picture of a second view (e.g., view 1) where the first view is different from the second view.

According to an embodiment of the disclosure, three-dimensional (3D) feature information can be determined based on pictures of different views. Feature information indicating features/key points can be extracted based on key pictures of multiple views, for example, from different angles. In an example, a current feature model (e.g., a 3D feature model based on multiple views) is determined (e.g., established) based on the feature information. The same 3D feature model can be used to render pictures from different views.

Figure 13:
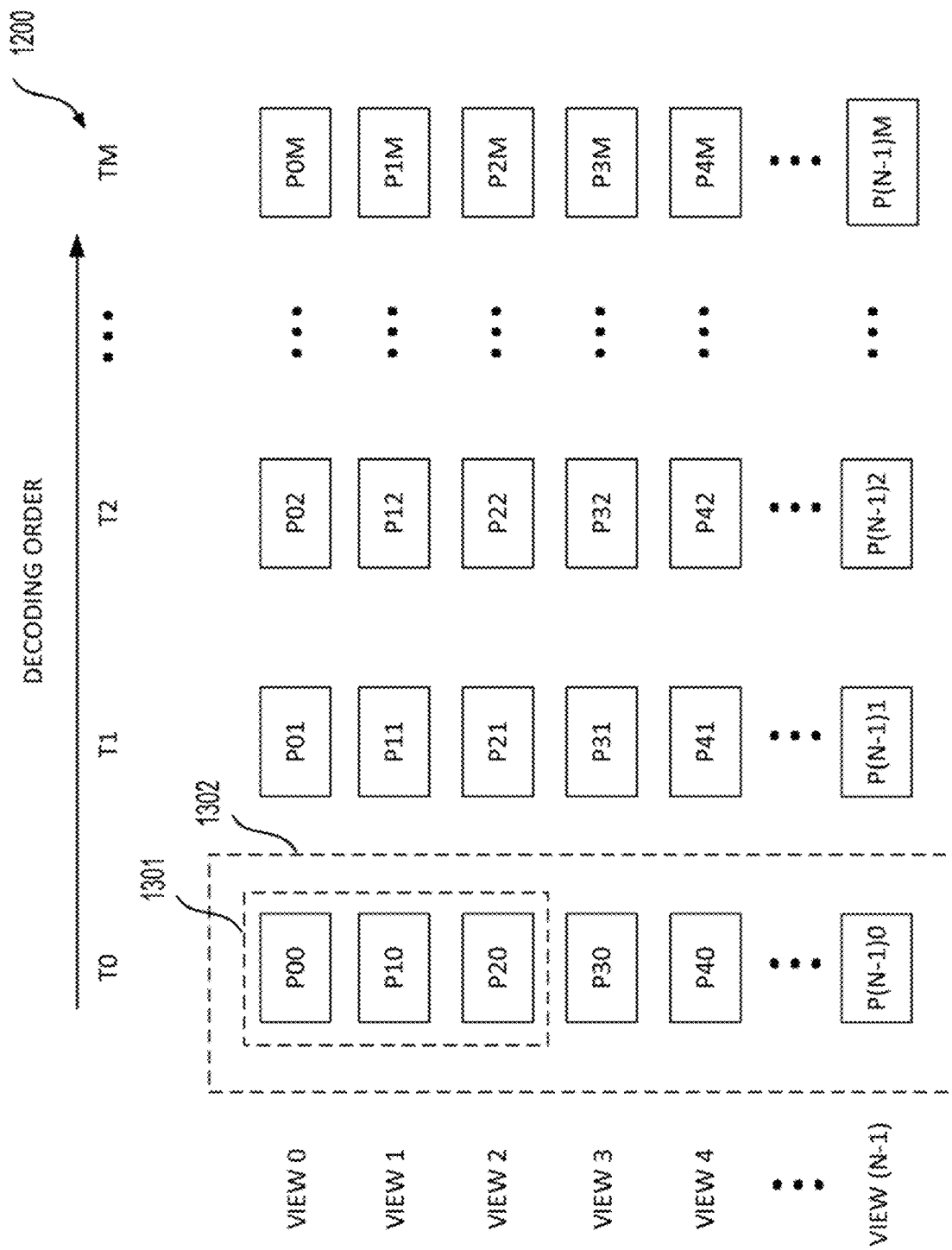
FIG. 13 shows exemplary key pictures of different views in a bitstream used to determine feature information of the key pictures according to an embodiment of the disclosure.

FIG. 13 shows exemplary key pictures of different views in the bitstream (1200) that can be used to determine feature information according to an embodiment of the disclosure. The bitstream (1200), the pictures P00-P(N−1)M, the views 0-(N−1), and the time instances T0-TM in FIG. 13 are described in FIG. 12.

In an embodiment, different pictures corresponding to different views at a time instance (e.g., T0) are used to determine 3D feature information or a current 3D feature model. The current 3D feature model can be used to encode and/or decode pictures from different views in the bitstream (1200). The 3D feature information (or the 3D feature model) that is specific to a content (e.g., a human face) of the key pictures can be determined based on a pre-determined 3D feature model (e.g., a canonical 3D feature model or a generic 3D feature model) and the key pictures. In an example, the pre-determined 3D feature model is adapted to the key pictures to generate the 3D feature information (or the 3D feature model).

In an example, an entire set (1302) of the pictures P00-P(N−1)0 at T0 is used to determine the 3D feature information or the current 3D feature model. For example, key pictures corresponding to all of the decoded views (e.g., views 0-(N−1)) are used to generate the current 3D feature model. The 3D feature information or the current 3D feature model generated based on the entire set (1302) can be referred to as unified 3D feature information or a current unified 3D feature model. The unified 3D feature information or the current unified 3D feature model can be used to code (e.g., encode, decode, or generate) a picture (e.g., a non-key picture such as P32) of a particular view (one of the views 0-(N−1), such as the view 3) and at a particular time instance (one of the time instances T0-TM, such as T2).

Referring to FIG. 13, a subset (1301) of the pictures P00-P(N−1)0 at T0 is used to determine the 3D feature information or the current 3D feature model. In an example, the subset (1301) includes the pictures P00, P10, and P20 of the views 0-2 at T0, respectively. The 3D feature information or the current 3D feature model generated based on the subset (1301) can be referred to as unified 3D feature information or a current unified 3D feature model that can be used to code (e.g., encode, decode, or generate) a picture (e.g., a non-key picture such as P32) of a particular view (one of the views 0-(N−1), such as the view 3) and at a particular time instance (one of the time instances T0-TM, such as T2).

Figure 14:
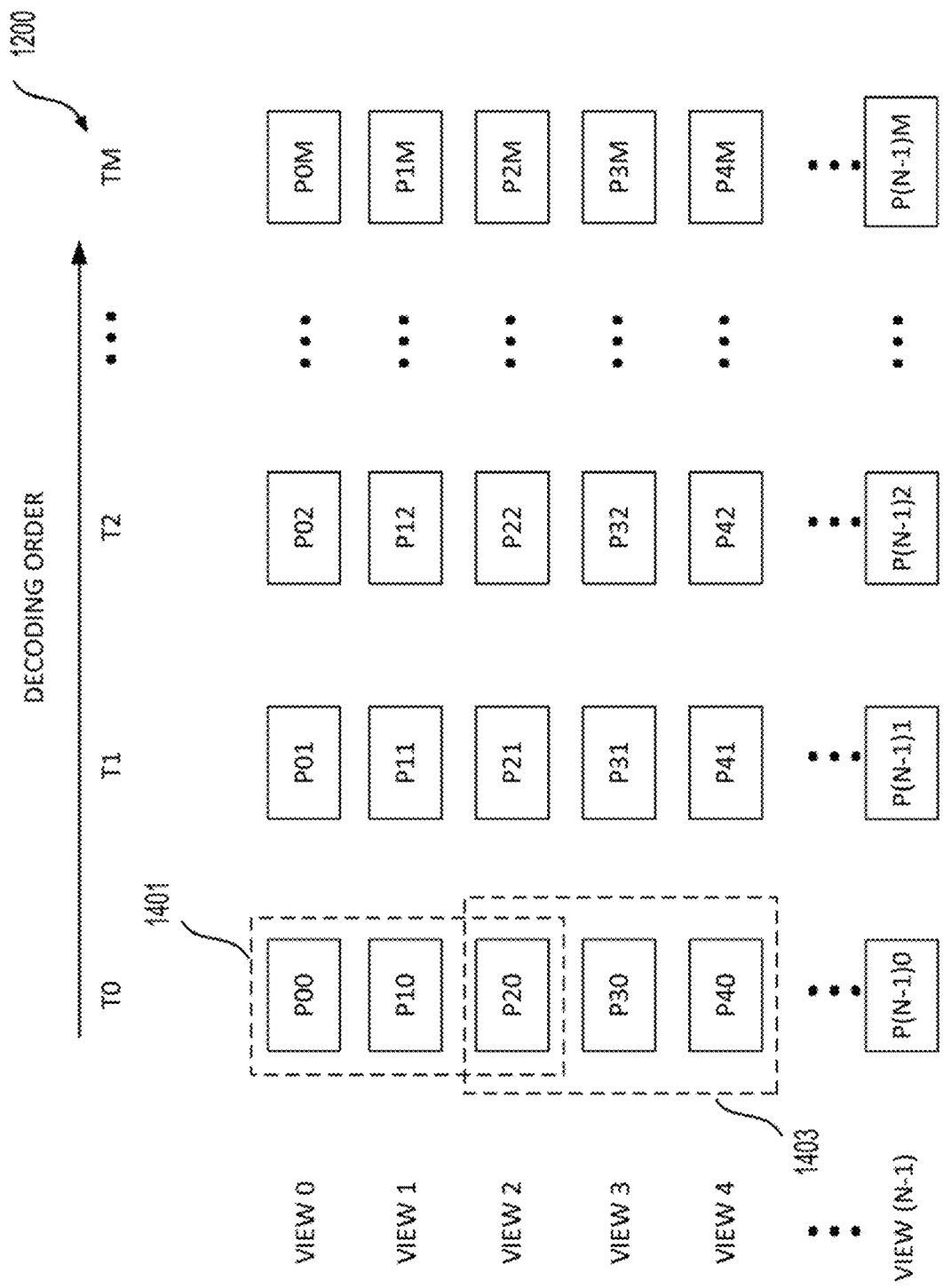
FIG. 14 shows exemplary subsets of key pictures of different views in a bitstream used to determine a plurality of 3D feature information according to an embodiment of the disclosure.

FIG. 14 shows exemplary subsets of key pictures of different views in the bitstream (1200) that can be used to determine pieces of 3D feature information according to an embodiment of the disclosure. Pictures (e.g., non-key pictures) in the bitstream (1200) can be determined based on the determined multiple pieces of 3D feature information or corresponding different current 3D feature models. The bitstream (1200), the pictures P00-P(N−1)M, the views 0-(N−1), and the time instances T0-TM in FIG. 14 are described in FIG. 12.

A first subset (e.g., the subset (1401)) of pictures of first views (e.g., the views 0-2) at a time instance (e.g., P00-P(N−1)0 at T0) can be used to determine first 3D feature information or a first current 3D feature model. In an example, the first subset (1401) includes the pictures P00, P10, and P20 of the views 0-2 at T0, respectively. The first 3D feature information or the first current 3D feature model can be used to code (e.g., encode, decode, or generate) a picture (e.g., a non-key picture such as P02) of one of the first views (one of the views 0-2, such as the view 0) and at a particular time instance (one of the time instances T0-TM, such as T2).

A second subset (2103) of the pictures at the time instance (e.g., P00-P(N−1)0 at T0) can be used to determine second 3D feature information or a second current 3D feature model. In an example, the second subset (2103) includes the pictures P20, P30, and P40 of the views 2-4 at T0, respectively. The second 3D feature information or the second current 3D feature model can be used to code (e.g., encode, decode, or generate) a picture (e.g., a non-key picture such as P32) of one of the second views (one of the views 2-4, such as the view 3) and at a particular time instance (one of the time instances T0-TM, such as T2).

Referring back to FIGS. 13-14, a feature change (e.g., obtained by a 3D transformation or a 3D deformation between two adjacent feature information corresponding to two adjacent pictures) of the 3D feature information can be signaled. The feature change can be sent in the bitstream (1200) to a decoder. At a decoder side, the respective 3D feature information or the respective 3D feature model (e.g., unified 3D feature information or a current unified 3D feature model in FIG. 13, different 3D feature information or different 3D feature models in FIG. 14) can be applied to the signaled feature change at different view angles to render reconstructed pictures of the particular views.

According to an embodiment of the disclosure, individual feature information (or a feature model) can be determined (e.g., built) for each view or a subset of views based on respective key pictures of multiple views. Each view may be associated with the respective feature information indicating respective features and/or key points of the view. In an example, an individual feature information (or a feature model) of a particular view and at a particular time instance is generated with key pictures of multiple views (e.g., multiple adjacent views) as an input.

Figure 15:
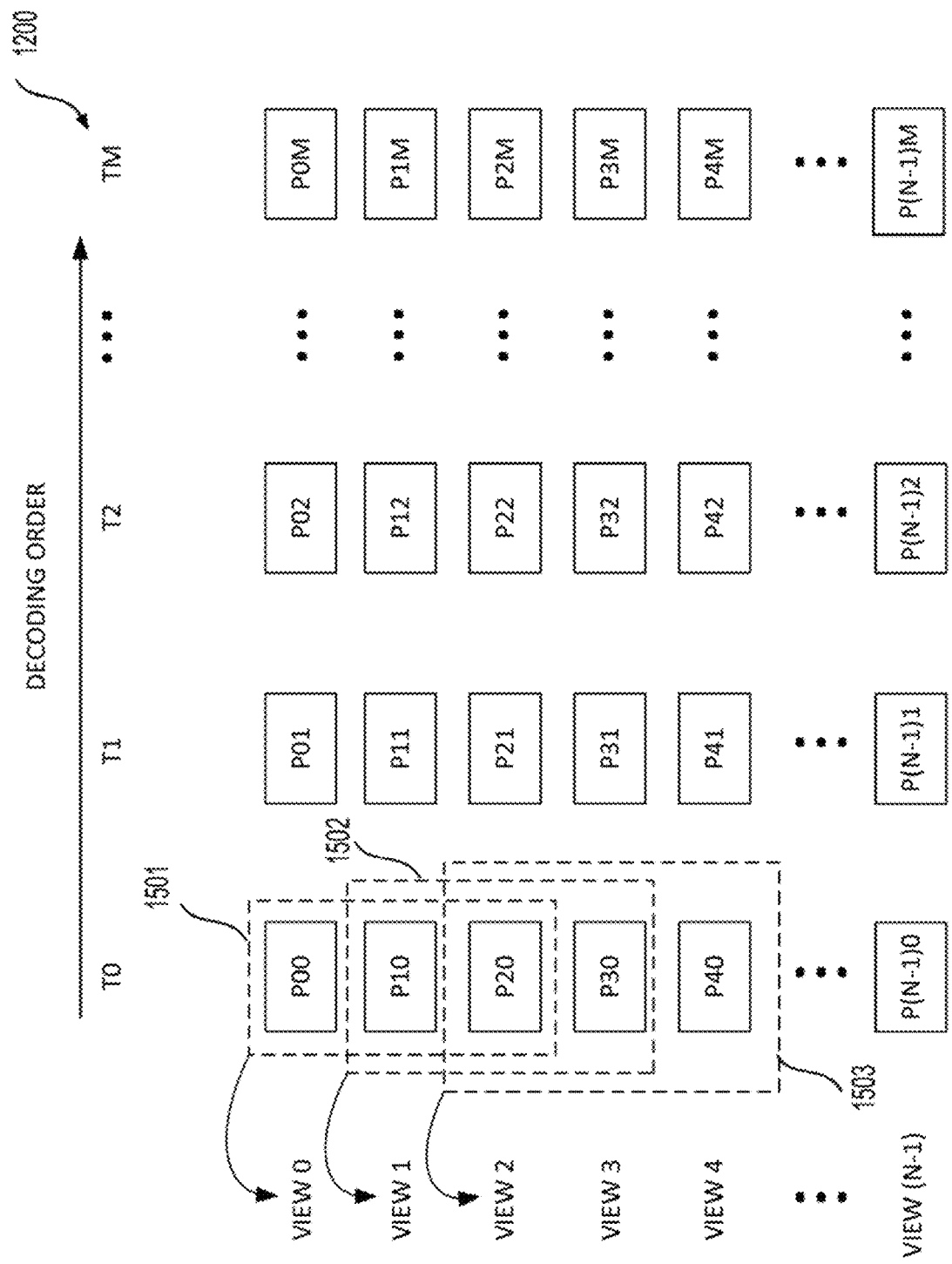
FIG. 15 shows exemplary subsets of key pictures of different views in a bitstream used to determine a plurality of feature information according to an embodiment of the disclosure.

FIG. 15 shows exemplary subsets of key pictures of different views in the bitstream (1200) that can be used to determine pieces of feature information according to an embodiment of the disclosure. The bitstream (1200), the pictures P00-P(N−1)M, the views 0-(N−1), and the time instances T0-TM in FIG. 15 are described in FIG. 12.

A first subset (e.g., a subset (1501)) of pictures of a set of first views (e.g., the views 0-2) at a time instance (e.g., P00-P(N−1)0 at T0) can be used to determine first feature information or a first current feature model for a first view (e.g., the view 0) in the set of first views. In an example, the first subset (1501) includes the pictures P00, P10, and P20 corresponding to the views 0-2 at T0, respectively. The first feature information or the first current feature model can be used to code (e.g., encode, decode, or generate) a picture (e.g., a non-key picture such as P02) of the first view (e.g., the view 0) and at a particular time instance (one of the time instances T0-TM, such as T2). In an example, the first feature information or the first current feature model is first 3D feature information or a first current 3D feature model. In an example, the first feature information or the first current feature model is first 2D feature information or a first current 2D feature model.

A second subset (e.g., a subset (1502)) of pictures of a set of second views (e.g., the views 1-3) at the same time instance (e.g., P00-P(N−1)0 at T0) can be used to determine second feature information or a second current feature model for a second view (e.g., the view 1) in the set of second views. In an example, the second subset (1502) includes the pictures P10, P20, and P30 corresponding to the views 1-3 at T0, respectively. The second feature information or the second current feature model can be used to code (e.g., encode, decode, or generate) a picture (e.g., a non-key picture such as P12) of the second view (e.g., the view 1) and at the particular time instance (one of the time instances T0-TM, such as T2).

In an example, a third subset (e.g., a subset (1503)) of pictures of a set of third views (e.g., the views 2-4) at the same time instance (e.g., P00-P(N−1)0 at T0) can be used to determine third feature information or a third current feature model for a third view (e.g., the view 2) in the set of third views. In an example, the third subset (1503) includes the pictures P20, P30, and P40 corresponding to the views 2-4 at T0, respectively. The third feature information or the third current feature model can be used to code (e.g., encode, decode, or generate) a picture (e.g., a non-key picture such as P22) of the third view (e.g., the view 2) and at the particular time instance (one of the time instances T0-TM, such as T2).

Figure 16:
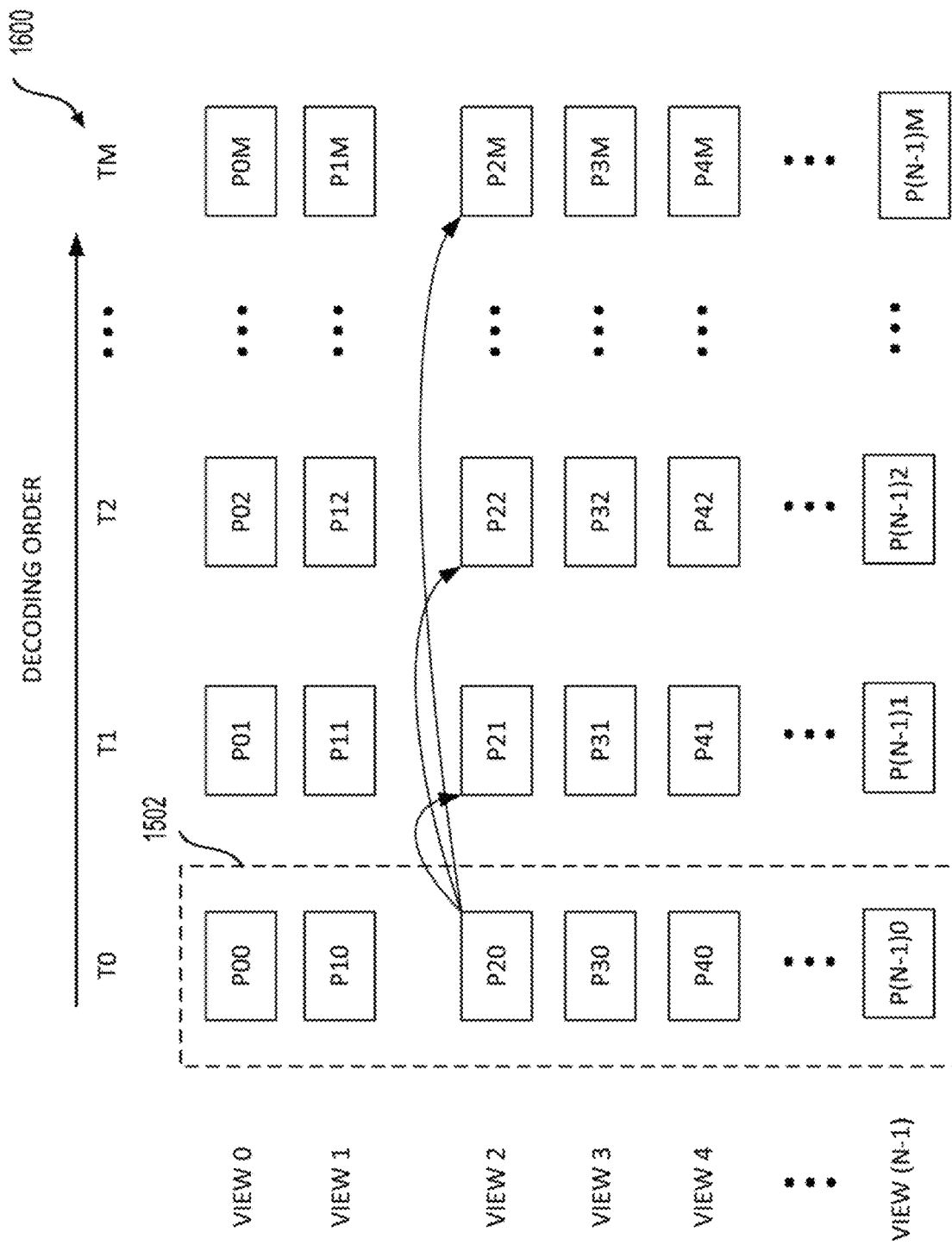
FIG. 16 shows an exemplary coding method in feature-based multi-view coding according to an embodiment of the disclosure.

FIG. 16 shows an exemplary coding method (1600) in feature-based multi-view coding according to an embodiment of the disclosure. The pictures P00-P(N−1)M in the bitstream (1200), the views 0-(N−1), and the time instances T0-TM in FIG. 16 are described in FIG. 12.

Pictures across different views at a time instance, such as a first time instance (e.g., T0) of an entire sequence in the bitstream (1200)) can be coded as key pictures, as described above. At a decoder side, the reconstructed key picture of each of the different views (e.g., the views 0-(N−1)) at the time instance (e.g., the first time instance, such as T0) can later be used as a key picture for feature-based rendering and/or reconstruction of pictures (e.g., non-key pictures) of the same view but at a different time instance.

For example, the entire set (1302) of the pictures at T0 including P00-P(N−1)0 are key pictures. The key pictures P00-P(N−1)0 at T0 can be coded (e.g., encoded and/or decoded), for example by using methods for a monoscopic video, such as video/image coding technologies (e.g., the intra(picture) and/or temporal inter(picture) predictions) described above (e.g., image/video coding technologies of HEVC and/or VVC). The encoded key pictures P00-P(N−1)0 can be transmitted to the decoder side. At the decoder side, the reconstructed key picture (e.g., P20) of a first view (e.g., the view 2) at T0 can later be used as a key picture to decode pictures (e.g., non-key pictures P20-P2M) of the first view (e.g., the view 2) but at different time instances (e.g., T1-TM), respectively, in a feature-based rendering and/or reconstruction process.

One or more embodiments in FIGS. 13-15 can be combined with an embodiment in FIG. 16. Referring to FIG. 16, the key pictures can include all the pictures at a first time instance (e.g., T0). Referring to FIGS. 13-15, feature information or a feature model can be determined based on a subset (e.g., (1301), (1401), (1501)) or the entire set (e.g., (1302)) of all the pictures at the first time instance (e.g., T0). The feature information or the feature model can be a unified 3D feature information or a unified 3D feature model in FIG. 13 that is applicable to all non-key pictures in the bitstream (1200), one of the multiple pieces of 3D feature information or one of the different current 3D feature models in FIG. 14 that is applicable to a subset of non-key pictures of the respective views in the bitstream (1200), or the individual feature information or the individual feature model in FIG. 15 that is applicable to a subset of non-key pictures of the respective view in the bitstream (1200).

Referring to FIG. 16, a feature change of a picture (e.g., a non-key picture P22) of a first view (e.g., view 2) may be generated based on the non-key picture P22 of the first view and a key picture at the first time instance (e.g., P20). In an example, the feature change of the non-key picture P22 of the first view is generated based on the non-key picture P22 of the first view and the key picture of the first view at the first time instance (e.g., P20), and the feature change indicates a feature change in the same view (e.g., the first view) in a time domain (e.g., from T0 to T2). The feature change and the key pictures (including P20) of all the views at the first time instance can be encoded. At a decoder side, the non-key picture P22 can be decoded based on the decoded feature change and the decoded key picture P20. In an example, the feature information or the feature model can be obtained at the decoder side using the same method as that of the encoder side from the respective decoded key pictures (e.g., the subset (1301), the subset (1401), the subset (1501), or the like). The non-key picture P22 can be decoded based on the feature change, the feature information or the feature model, and the decoded key picture P20.

Figure 17:
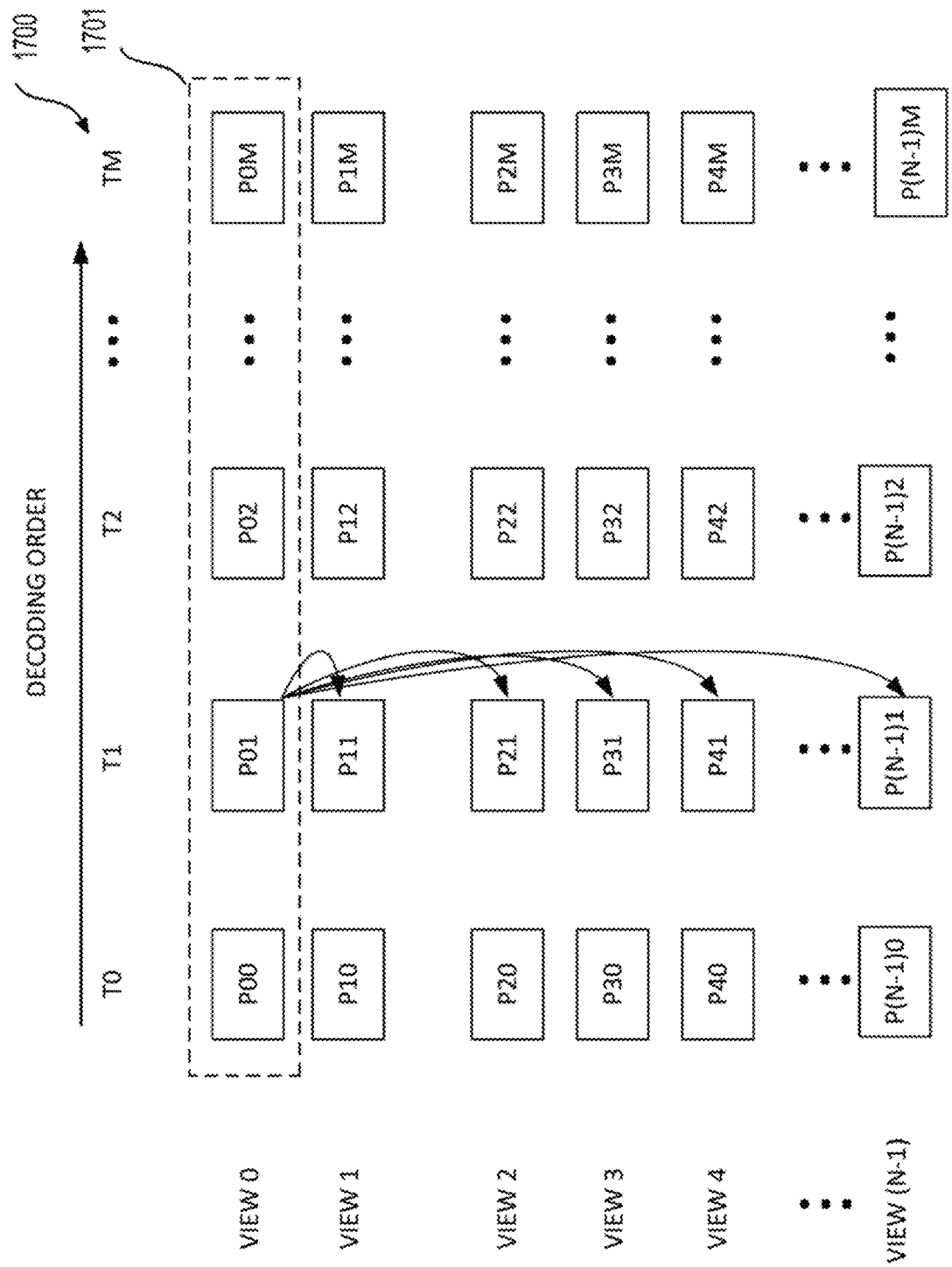
FIG. 17 shows an exemplary coding method in feature-based multi-view coding according to an embodiment of the disclosure.

FIG. 17 shows an exemplary coding method (1700) in feature-based multi-view coding according to an embodiment of the disclosure. The pictures P00-P(N−1)M in the bitstream (1200), the views 0-(N−1), and the time instances T0-TM in FIG. 17 are described in FIG. 12.

Pictures of a first view (e.g., the view 0) across different time instances (e.g., T0-TM) can be coded as key pictures, as described above. In an example, the key pictures include all the pictures (e.g., P00-P0M) of the first view. At a decoder side, the reconstructed key picture at each of the different time instances (e.g., T0-TM) in the first view can later be used as a key picture for feature-based rendering and/or reconstruction of a picture (e.g., a non-key picture) of the same time instance but of a different view.

For example, an entire set (1701) of the pictures of the first view (e.g., the view 0) including P00-P0M are key pictures. The key pictures P00-P0M of the view 0 can be coded (e.g., encoded and/or decoded), for example, using methods for a monoscopic video, such as video/image coding technologies (e.g., the intra(picture) and/or temporal inter(picture) predictions) described above (e.g., image/video coding technologies of HEVC and/or VVC). The encoded key pictures P00-P0M can be transmitted to the decoder side. At the decoder side, the reconstructed key picture (e.g., P01) of a time instance (e.g., T1) of the view 0 can later be used as a key picture to decode pictures (e.g., non-key pictures P11-P(N−1)1) of the time instance (e.g., T1) but of different views (e.g., the views 1-(N−1)), respectively, in a feature-based rendering and/or reconstruction process.

In an example of FIG. 17, a feature change of a non-key picture (e.g., P21) of a second view (e.g., view 2) with respect to a key picture (e.g., P01) of the first view (e.g., view 0) at the same time instance (e.g., T1) is determined based on the non-key picture (e.g., P21) of the second view (e.g., view 2) and the key picture (e.g., P01) of the first view (e.g., view 0) at the same time instance (e.g., T1). The feature change indicates a feature change at the same time instance with respect to views (e.g., from the first view to the second view). The feature change can be encoded and transmitted into the decoder side. At the decoder side, the non-key picture (e.g., P21) can be generated based on the decoded feature change with respect to the views (e.g., from the first view to the second view) and the key picture at the same time instance (e.g., P01).

In an example, feature information of one or more key pictures (e.g., including P01) of the first view (e.g., view 0) is extracted from the one or more key pictures (e.g., including P01) of the first view at an encoder side and/or the decoder side. At the decoder side, the non-key picture (e.g., P21) can be generated based on the decoded feature change with respect to the views (e.g., from the first view to the second view), the key picture at the same time instance (e.g., P01), and the feature information of the one or more key pictures (e.g., including P01) of the first view (e.g., view 0).

The coding methods (1600) and (1700) can be referred to as feature-based multi-view coding architectures. In an example, the two feature-based multi-view coding methods (1600) and (1700) can be combined. Key pictures can include a combination of (i) pictures at different time instances of a view and (i) pictures of different views at a time instance. For examples, key pictures include a combination of (i) all pictures at different time instances of a view and (i) all pictures of different views at a time instance.

Figure 18:
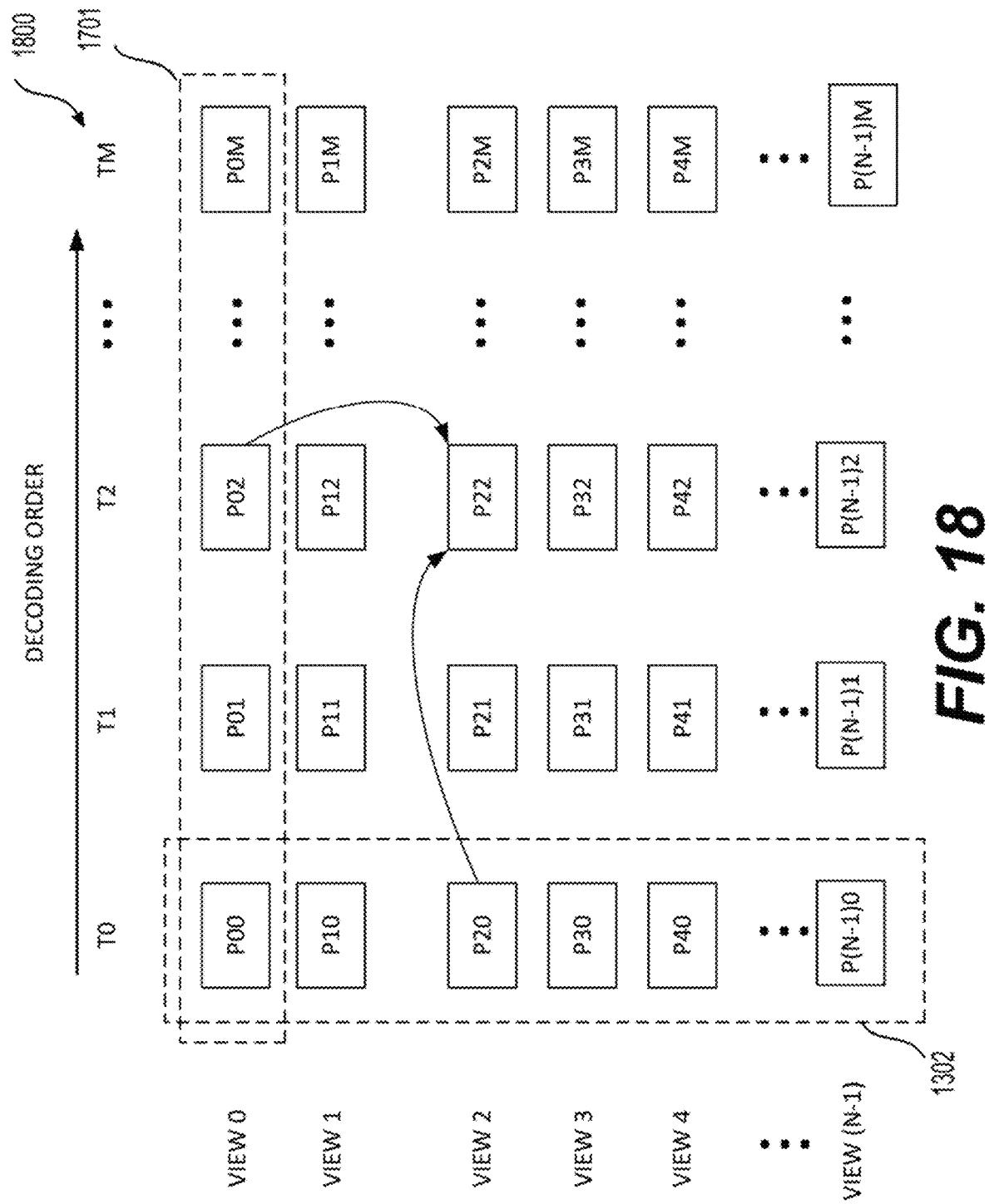
FIG. 18 shows an exemplary coding method in feature-based multi-view coding according to an embodiment of the disclosure.

FIG. 18 shows an exemplary coding method (1800) in feature-based multi-view coding according to an embodiment of the disclosure. The pictures P00-P(N−1)M in the bitstream (1200), the views 0-(N−1), and the time instances T0-TM in FIG. 18 are described in FIG. 12.

Pictures of a first view (e.g., the view 0) across different time instances (e.g., T0-TM) can be coded as key pictures, as described above. Pictures across different views at a time instance, such as a first time instance (e.g., T0) of an entire sequence in the bitstream (1200)) can be coded as key pictures. In an example, the key pictures include (i) a first set including all the pictures (e.g., P00-P0M) of the first view and (ii) a second set including all the pictures (e.g., P00-P(N−1)0) of all views (e.g., the views 0-(N−1)) at a first time instance (e.g., T0). Since P00 is shared by the first set and the second set, the key pictures include P00-P0M and P10-P(N−1)0. The key pictures P00-P0M and P10-P(N−1)0 can be coded (e.g., encoded and/or decoded) using for example methods for a monoscopic video, such as video/image coding technologies (e.g., the intra(picture) and/or temporal inter(picture) predictions) described above (e.g., image/video coding technologies of HEVC and/or VVC). The encoded key pictures P00-P0M and P10-P(N−1)0 can be transmitted to the decoder side.

At a decoder side, a picture (e.g., a non-key picture P22) at a second time instance (e.g., T2) of a second view (e.g., the view 2) can be reconstructed based on (i) a first reconstructed key picture (e.g., P02) in the first set (e.g., P00-P0M) that is at the second time instance and (ii) a second reconstructed key picture (e.g., P20) in the second set (e.g., P00-P(N−1)0) that is of the second view (e.g., the view 2).

Different views can be assigned with different priorities for transmission or delivery. In some examples, certain views (e.g., views with lower priorities than priorities of other views) may be discarded, for example, when bandwidth is limited.

Multiple pieces of feature information and/or associated feature changes in different time instances, if associated with respective views, can have the same priorities as the associated views. In an example, feature information for a view (e.g., the view 0), such as feature information of picture(s) of the view, can be assigned with a same priority in transmission as the view (e.g., the view 0). Referring back to FIG. 12, first piece(s) of feature information and/or first feature change(s) associated with one or more pictures of a first view (e.g., the view 0), such as one or more pictures in P00-P0M, can have a first priority as the first view (e.g., the view 0). Second piece(s) of feature information and/or second feature change(s) associated with one or more pictures of a second view (e.g., the view 1), such as one or more pictures in P10-P1M, can have a second priority as the second view (e.g., the view 1).

Common feature information can be shared by multiple views (e.g., the first view (e.g., the view 0) and the second view (e.g., the view 1)). For example, the first piece of feature information of the first view and the second piece of feature information of the second view both indicate eyes, a nose, and a mouth. The first piece of feature information indicates a left ear, and the second piece of feature information indicates a right ear. Common feature information shared by the first view and the second view indicates features and/or key points of the eyes, the nose, and the mouth. Non-common feature information indicates features and/or key points of the left and right ears. According to an embodiment of the disclosure, the common feature information (e.g., the eyes, the nose, and the mouth) shared by the multiple views (e.g., the first view and the second view) can have a higher priority than a priority of non-common feature information associated with the same view.

If unified feature information or a unified feature model is used to describe the features and/or key points of all the views, the unified feature information or the unified feature model at different time instances can be of the highest priorities and is to be transmitted to the decoder. In an example, the unified feature information or the unified feature model at different time instances is not discarded.

Priorities of views may be a separate set of priorities, for example, the priorities of views are different from priorities that are set for temporal layers of a video bitstream.

Figure 19:
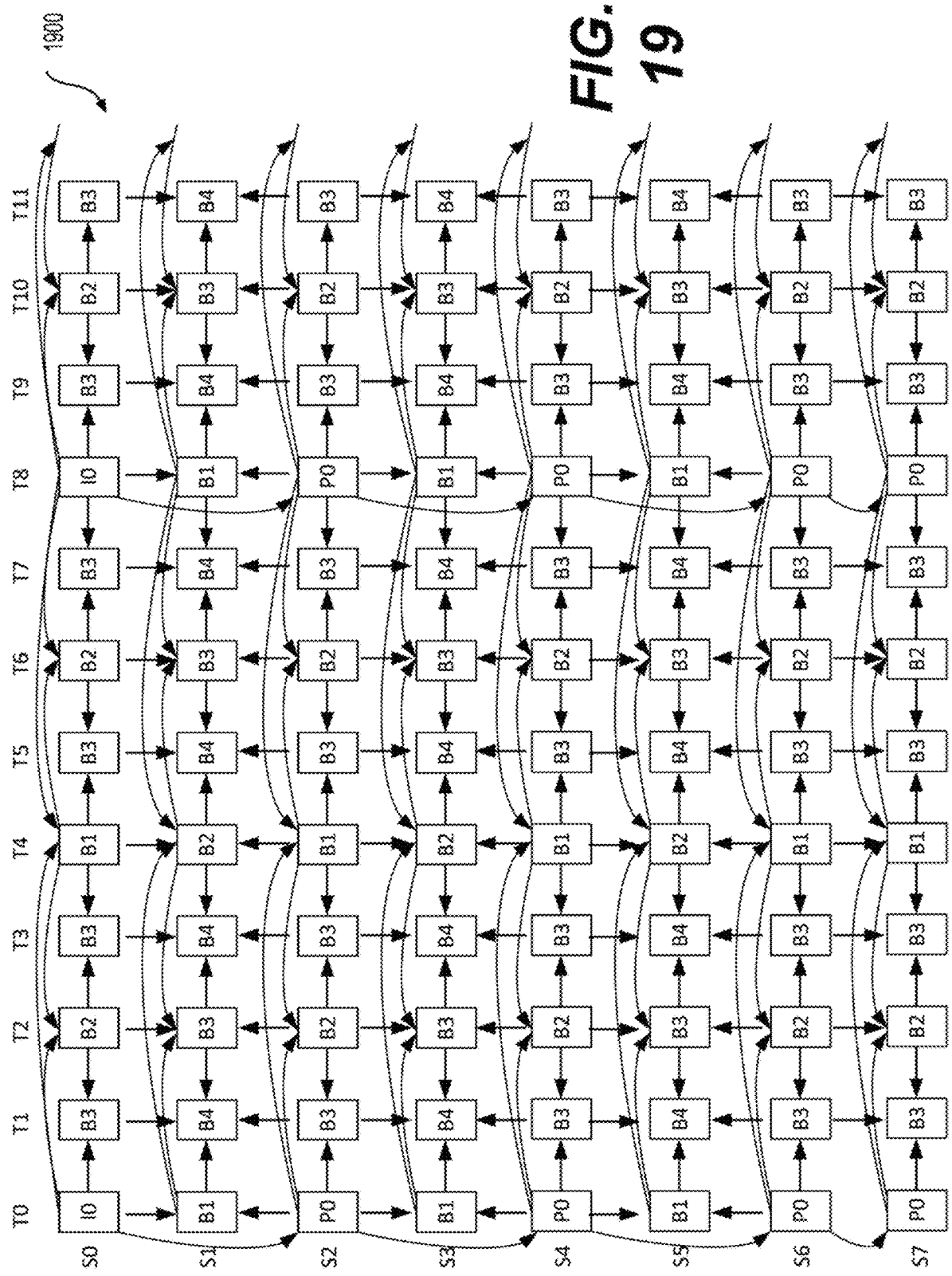
FIG. 19 shows an example of pictures at different time instances and of different views according to an embodiment of the disclosure.

FIG. 19 shows an example of pictures at different time instances and corresponding to different views according to an embodiment of the disclosure. The time instances are indicated by T0-T11. The views are indicated by S0-S7. The pattern of the pictures can repeat along a time axis, for example, with a period of 8. A pattern of the pictures from T8 to T11 repeats the pattern of the pictures from T0-T3. Pictures indicated by I0 can be independently coded without referring to another picture. Pictures indicated by P0 can be coded based on another picture, such as a picture I0. Pictures indicated by B1, B2, and B3 can be coded based on two other pictures. In an example, B1 is predicted based on $I0(s)$ and/or $P0(s)$. In an example, B2 is predicted based on $I0(s)$, $P0(s)$, and $B1(s)$. In an example, B3 is predicted based on $I0(s)$, $P0(s)$, $B1(s)$, and $B2(s)$. In an example, B4 is predicted based on four other pictures including $B1(s)$, and $B2(s)$, and $B3(s)$.

The priorities of views at a certain time instance (e.g., T0) can be as follows in a descending priority: a priority of the view S0, a priority of the view S2, a priority of the view S4, a priority of the view S6, a priority of the view S7, and priorities of the views S1, S3, and S5. In an example, the priorities of the views S1, S3, and S5 are identical. The priorities of views at another time instance (e.g., T1) may be identical to those in the time instance T0 described above.

The priorities of temporal layers (e.g., T0-T7) for a certain view (e.g., S0) can be as follows in a descending priority: a priority of the temporal layer T0, a priority of the temporal layer T4, priorities of the temporal layers T2 and T6, and priorities of the temporal layers T1, T3, T5, and T7. In an example, the priorities of the temporal layers T2 and T6 are identical. In an example, the priorities of the temporal layers T1, T3, T5, and T7 are identical. The priorities of temporal layers in another view (e.g., S1) may be identical to those in the view S0 described above.

The priorities of views may reuse the priorities that are set for the temporal layers of the video bitstream.

Figure 20:
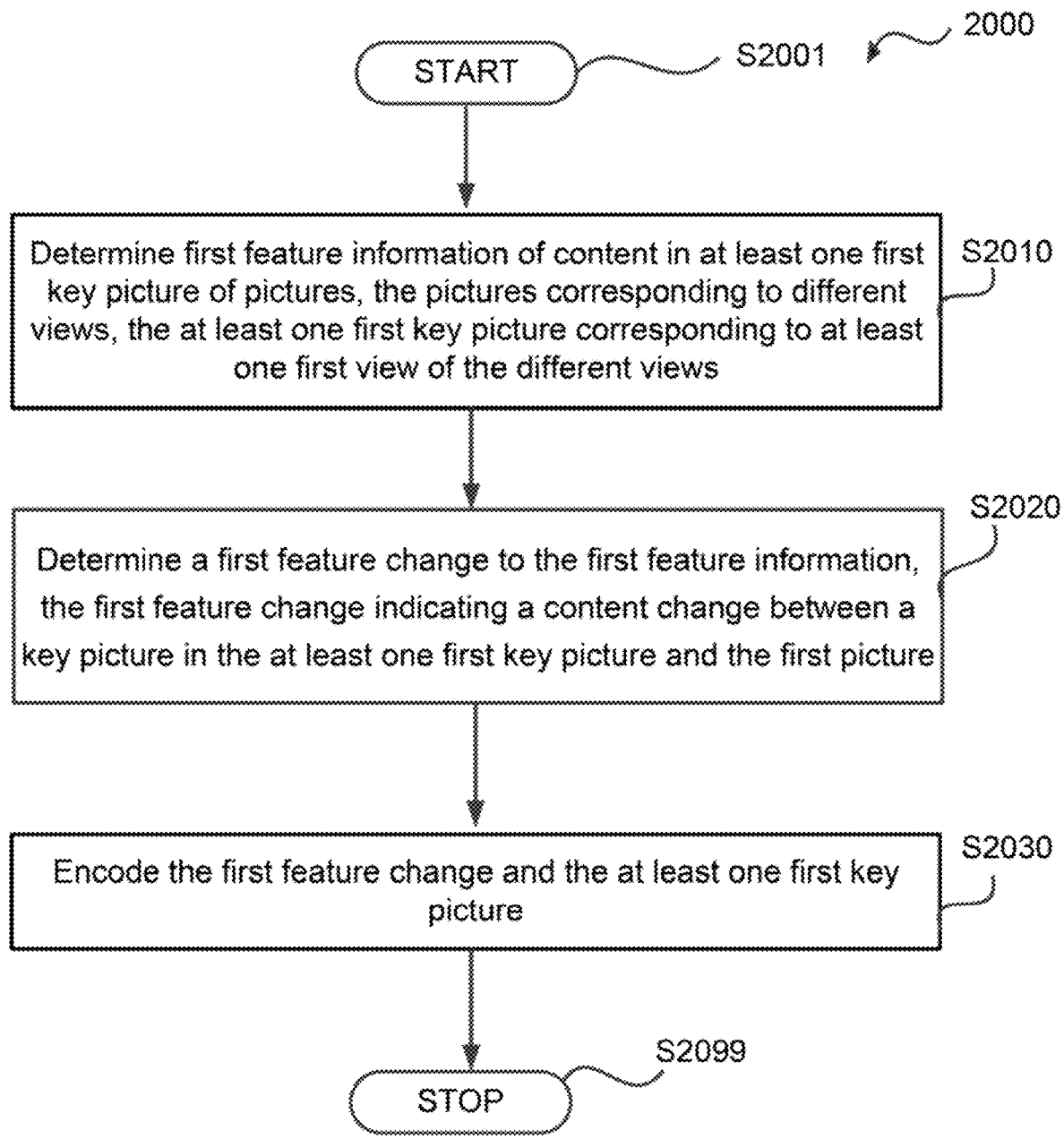
FIG. 20 shows a flow chart outlining an encoding process according to an embodiment of the disclosure.

FIG. 20 shows a flow chart outlining an encoding process (2000) according to an embodiment of the disclosure. In various embodiments, the process (2000) is executed by processing circuitry, such as the processing circuitry in the terminal devices (310), (320), (330) and (340), processing circuitry that performs functions of a video encoder (e.g., (403), (603), (703)), or the like. In some embodiments, the process (2000) is implemented in software instructions, thus when the processing circuitry executes the software instructions, the processing circuitry performs the process (2000). The process starts at (S2001), and proceeds to (S2010).

At (S2010), first feature information or a first current feature model of content in at least one first key picture of pictures can be determined, such as described in FIGS. 13-15. The pictures correspond to different views (e.g., views 0-(N−1)), and the at least one first key picture corresponds to at least one first view of the different views.

At (S2020), a first feature change to the first feature information can be determined. The first feature change can indicate a content change between a key picture in the at least one first key picture and the first picture, such as described above (e.g., in FIGS. 11B, 16, and 17).

At (S2030), the first feature change and the at least one first key picture can be encoded. In an example, the first feature change and the at least one first key picture are included into a multi-view bitstream, as described in FIGS. 11B, 16, and 17.

The process (2000) proceeds to (S1399), and terminates.

The process (2000) can be suitably adapted to various scenarios and steps in the process (2000) can be adjusted accordingly. One or more of the steps in the process (2000) can be adapted, omitted, repeated, and/or combined. Any suitable order can be used to implement the process (2000). Additional step(s) can be added.

Figure 21:
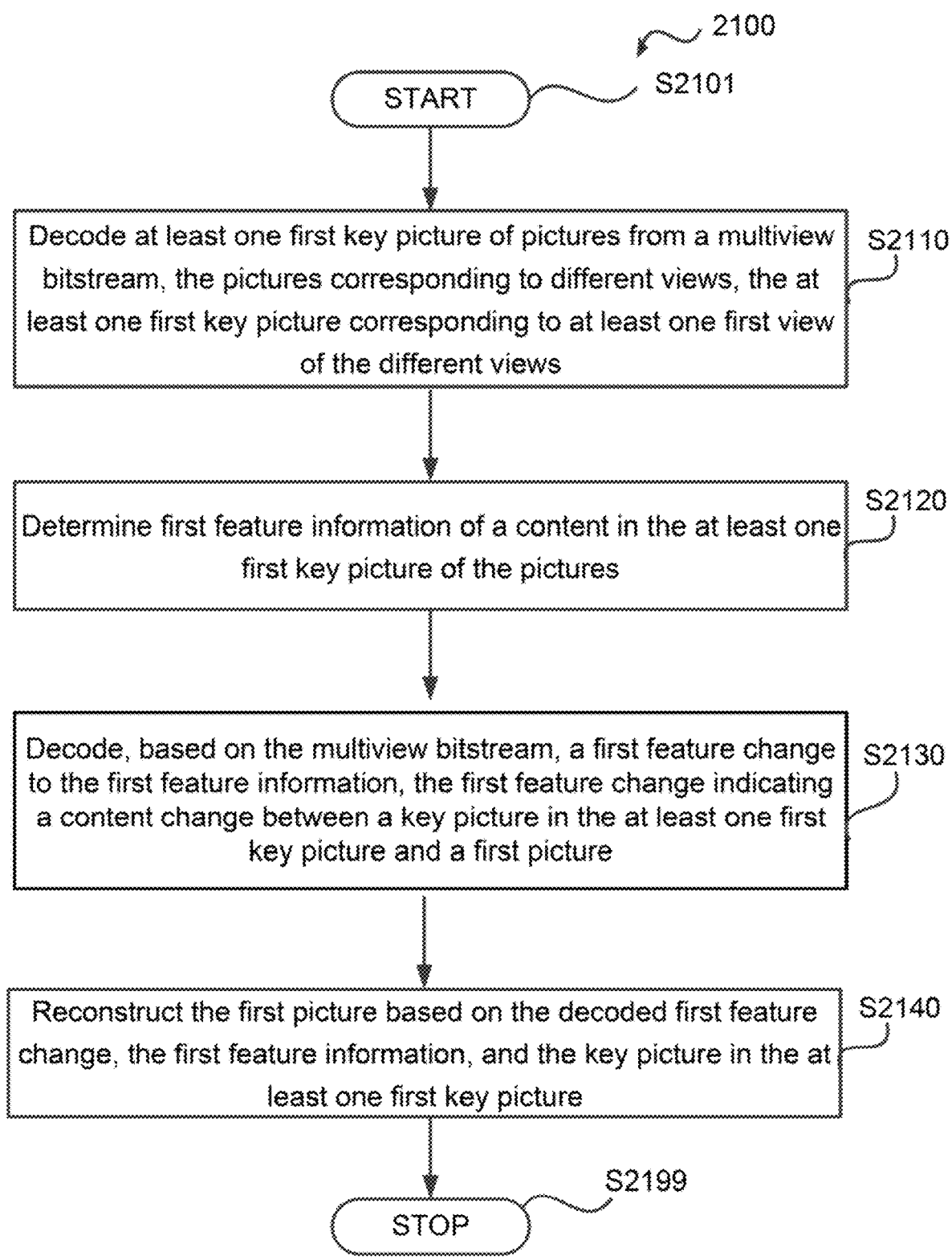
FIG. 21 shows a flow chart outlining a decoding process according to an embodiment of the disclosure.

FIG. 21 shows a flow chart outlining a decoding process (2100) according to an embodiment of the disclosure. In various embodiments, the process (2100) is executed by processing circuitry, such as the processing circuitry in the terminal devices (310), (320), (330) and (340), the processing circuitry that performs functions of the video encoder (403), the processing circuitry that performs functions of the video decoder (410), the processing circuitry that performs functions of the video decoder (510), the processing circuitry that performs functions of the video encoder (603), and the like. In some embodiments, the process (2100) is implemented in software instructions, thus when the processing circuitry executes the software instructions, the processing circuitry performs the process (2100). The process starts at (S2101), and proceeds to (S2110).

At (S2110), at least one first key picture of pictures from a multi-view bitstream can be decoded. The pictures can correspond to different views. The at least one first key picture can correspond to at least one first view of the different views.

At (S2120), first feature information of content or a first current feature model in the at least one first key picture of the pictures can be determined, such as described in FIGS. 13-15.

In an example, the at least one first key picture corresponds to a first time instance. The at least one first key picture includes multiple first key pictures. The at least one first view of the different views includes multiple first views. The first feature information includes first 3D feature information or a first 3D current feature model indicated by the multiple first views, such as described in FIGS. 13-14.

In an example, the first 3D feature information at the first time instance is determined based on a first pre-determined 3D feature model and the multiple first key pictures.

The first 3D feature information can be used to decode a picture of each view of the different views.

The multiple first key pictures include each key picture at the first time instance. Referring to FIG. 13, the at least one first key picture includes P00-P(N−1)0.

In an example, the first picture is of a view in the different views at a second time instance.

In an example, second 3D feature information of the content in multiple second key pictures of the pictures at the first time instance is determined based on a second pre-determined 3D feature model, such as described in FIG. 14. The multiple second key pictures correspond to the first time instance of multiple second views in the different views.

At (S2130), based on the multi-view bitstream, a first feature change to the first feature information can be decoded. The first feature change can indicate a content change between a key picture in the at least one first key picture and a first picture.

At (S2140), the first picture can be reconstructed based on the decoded first feature change, the first feature information, and the key picture in the at least one first key picture The process (2100) proceeds to (S2199), and terminates.

The process (2100) can be suitably adapted to various scenarios and steps in the process (2100) can be adjusted accordingly. One or more of the steps in the process (2100) can be adapted, omitted, repeated, and/or combined. Any suitable order can be used to implement the process (2100). Additional step(s) can be added.

In an embodiment, the first feature information is associated with a first view in the at least one first view, such as described in FIG. 15. For each view of the different views that is not the first view, respective feature information can be determined based on a key picture of the view and another key picture of an adjacent view of the different views. Based on the multi-view bitstream, a feature change to the respective feature information can be decoded where the feature change corresponds to a respective picture of the view. The picture of the view can be generated based on the respective feature change, the respective feature information, and the key picture of the view.

A subset of the pictures of a first view of the at least one first view corresponding to respective time instances can be decoded where the subset of the pictures of the first view includes the key picture in the at least one first key picture. The first picture is of a second view of the different views. The first picture and the key picture in the at least one first key picture correspond to a first time instance. The first feature change indicates a feature change between the first picture of the second view at the first time instance and the key picture of the first view at the first time instance.

In an example, each picture of a first view of the at least one first view can be decoded as a key picture where each picture of the first view corresponds to a respective time instance.

Embodiments in the disclosure can be applied to a video sequence with multiple views or a still picture with multiple views. Applications include but are not limited to VR 360, free-view systems, a light field video, and the like.

Embodiments in the disclosure may be used separately or combined in any order. Further, each of the methods (or embodiments), an encoder, and a decoder may be implemented by processing circuitry (e.g., one or more processors or one or more integrated circuits). In one example, the one or more processors execute a program that is stored in a non-transitory computer-readable medium.

The techniques described above, can be implemented as computer software using computer-readable instructions and physically stored in one or more computer-readable media. For example, FIG. 22 shows a computer system (2200) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 22:
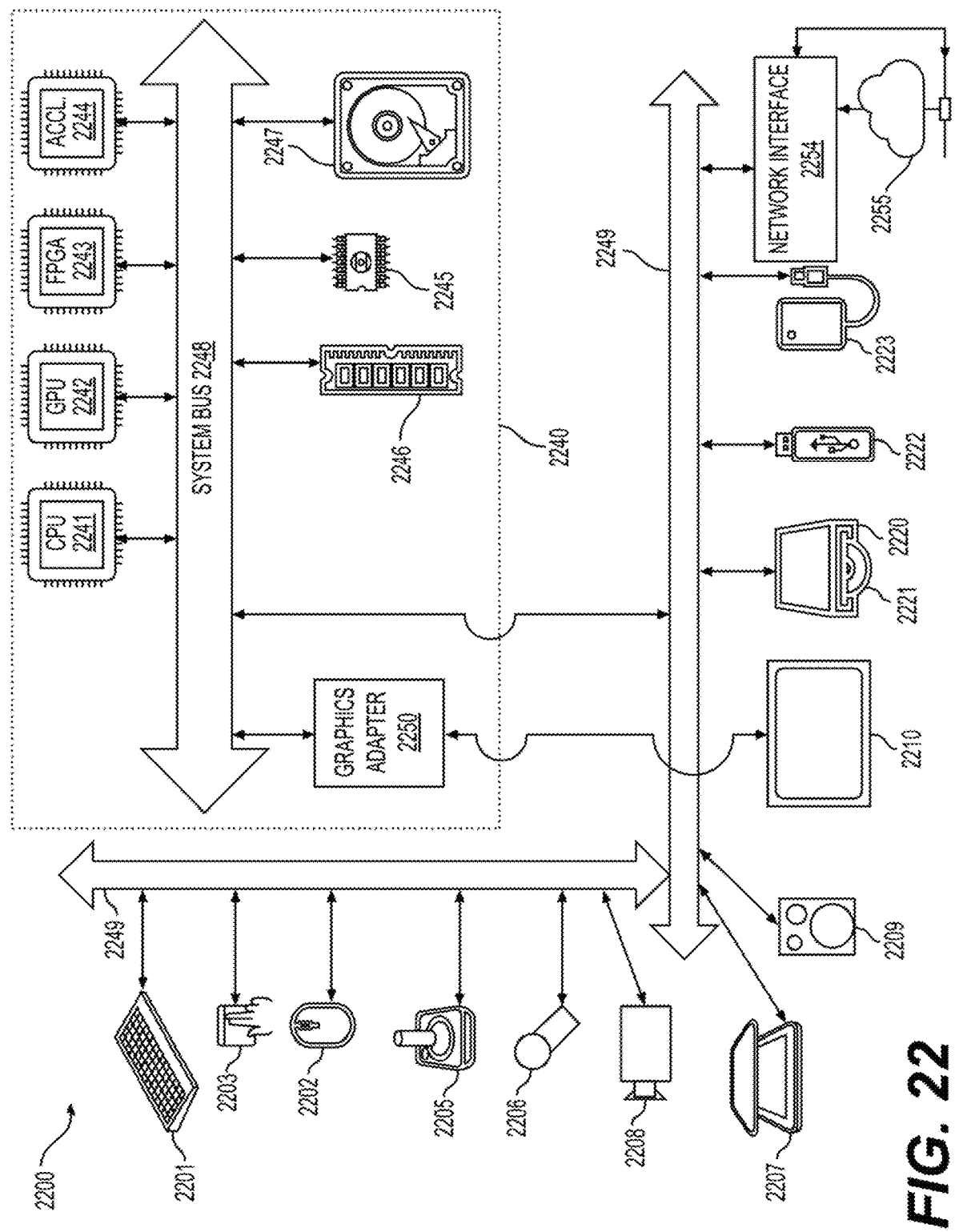
FIG. 22 is a schematic illustration of a computer system in accordance with an embodiment.

The components shown in FIG. 22 for computer system (2200) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (2200).

Computer system (2200) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (2201), mouse (2202), trackpad (2203), touch-screen (2210), data-glove (not shown), joystick (2205), microphone (2206), scanner (2207), camera (2208).

Computer system (2200) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (2210), data-glove (not shown), or joystick (2205), but there can also be tactile feedback devices that do not serve as input devices), audio output devices (such as: speakers (2209), headphones (not depicted)), visual output devices (such as screens (2210) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (2200) can also include human accessible storage devices and their associated media such as optical media including CD/DVD ROM/RW (2220) with CD/DVD or the like media (2221), thumb-drive (2222), removable hard drive or solid state drive (2223), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (2200) can also include an interface (2254) to one or more communication networks (2255). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (2249) (such as, for example USB ports of the computer system (2200)); others are commonly integrated into the core of the computer system (2200) by attachment to a system bus as described below (for example Ethernet interface into a PC computer system or cellular network interface into a smartphone computer system). Using any of these networks, computer system (2200) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (2240) of the computer system (2200).

The core (2240) can include one or more Central Processing Units (CPU) (2241), Graphics Processing Units (GPU) (2242), specialized programmable processing units in the form of Field Programmable Gate Areas (FPGA) (2243), hardware accelerators for certain tasks (2244), graphics adapters (2250), and so forth. These devices, along with Read-only memory (ROM) (2245), Random-access memory (2246), internal mass storage such as internal non-user accessible hard drives, SSDs, and the like (2247), may be connected through a system bus (2248). In some computer systems, the system bus (2248) can be accessible in the form of one or more physical plugs to enable extensions by additional CPUs, GPU, and the like. The peripheral devices can be attached either directly to the core's system bus (2248), or through a peripheral bus (2249). In an example, the screen (2210) can be connected to the graphics adapter (2250). Architectures for a peripheral bus include PCI, USB, and the like.

CPUs (2241), GPUs (2242), FPGAs (2243), and accelerators (2244) can execute certain instructions that, in combination, can make up the aforementioned computer code. That computer code can be stored in ROM (2245) or RAM (2246). Transitional data can be stored in RAM (2246), whereas permanent data can be stored for example, in the internal mass storage (2247). Fast storage and retrieve to any of the memory devices can be enabled through the use of cache memory, that can be closely associated with one or more CPU (2241), GPU (2242), mass storage (2247), ROM (2245), RAM (2246), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (2200), and specifically the core (2240) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (2240) that are of non-transitory nature, such as core-internal mass storage (2247) or ROM (2245). The software implementing various embodiments of the present disclosure can be stored in such devices and executed by core (2240). A computer-readable medium can include one or more memory devices or chips, according to particular needs. The software can cause the core (2240) and specifically the processors therein (including CPU, GPU, FPGA, and the like) to execute particular processes or particular parts of particular processes described herein, including defining data structures stored in RAM (2246) and modifying such data structures according to the processes defined by the software. In addition or as an alternative, the computer system can provide functionality as a result of logic hardwired or otherwise embodied in a circuit (for example: accelerator (2244)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC))

storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit
R-D: Rate-Distortion While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding in a video decoder, comprising:
    decoding multiple first key pictures of pictures from a multi-view bitstream, the pictures corresponding to different views, the multiple first key pictures corresponding to multiple first views of the different views, the multiple first key pictures corresponding to a first time instance;
    determining first feature information of a first content in the multiple first key pictures of the pictures, the first feature information including first three-dimensional (3D) feature information indicated by the multiple first views, the first 3D feature information at the first time instance being determined based on a first pre-determined 3D feature model and the multiple first key pictures;
    decoding, based on the multi-view bitstream, a first feature change to the first feature information, the first feature change indicating a change of the first content between a key picture in the multiple first key pictures and a first picture; and
    reconstructing the first picture based on the decoded first feature change, the first feature information, and the key picture in the multiple first key pictures.

2. The method of claim 1, wherein the first 3D feature information is used to decode a picture of each view of the different views.

3. The method of claim 1, wherein the multiple first key pictures include each key picture at the first time instance.

4. The method of claim 1, comprising:
    determining second 3D feature information of a second content in multiple second key pictures of the pictures at the first time instance based on a second pre-determined 3D feature model, the multiple second key pictures corresponding to the first time instance of multiple second views in the different views.

5. The method of claim 1, wherein
    the first feature information is associated with a first view in the multiple first views; and
    for each view of the different views that is not the first view, the method further includes:
        determining respective feature information based on a key picture of the view and another key picture of an adjacent view of the different views;
        decoding, based on the multi-view bitstream, a feature change to the respective feature information, the feature change corresponding to a respective picture of the view; and
        generating the picture of the view based on the respective feature change, the respective feature information, and the key picture of the view.

6. The method of claim 3, wherein
    the first picture of a view in the different views is at a second time instance.

7. The method of claim 1, wherein
    the method includes decoding a subset of the pictures corresponding to the different views, the subset of the pictures being of a first view of the multiple first views corresponding to respective time instances, the subset of the pictures of the first view including the key picture in the multiple first key pictures;
    the first picture is of a second view of the different views;
    the first picture and the key picture in the multiple first key pictures correspond to the first time instance; and
    the first feature change indicates a feature change between the first picture of the second view at the first time instance and the key picture of the first view at the first time instance.

8. The method of claim 6, further comprising:
    decoding each picture of a first view of the multiple first views as a key picture, each picture of the first view corresponding to a respective time instance.

9. The method of claim 1, wherein each of (i) the key picture in the multiple first key pictures and (ii) the first picture comprise the first content and a second content, and the change of the first content indicated by the first feature change is larger than a change of the second content between the key picture and the first picture.

10. The method of claim 9, wherein the first content indicates a human face and the second content indicates a background that does not include the human face.

11. The method of claim 9, wherein the first content corresponds to a first portion of the first picture, the second content corresponds to a second portion of the first picture, and the first portion is less than the second portion.

12. A method for video encoding in a video encoder, comprising:
   determining first feature information of a first content in multiple first key pictures of pictures, the pictures corresponding to different views, the multiple first key pictures corresponding to multiple first views of the different views, the multiple first key pictures corresponding to a first time instance, the first feature information including first three-dimensional (3D) feature information indicated by the multiple first views, the first 3D feature information at the first time instance being determined based on a first pre-determined 3D feature model and the multiple first key pictures;
   determining a first feature change to the first feature information, the first feature change indicating a change of the first content between a key picture in the multiple first key pictures and a first picture;
   encoding the multiple first key pictures of the pictures in a multi-view bitstream; and
   encoding, in the multi-view bitstream, the first feature change.

13. The method of claim 12, wherein the first 3D feature information is used to decode a picture of each view of the different views.

14. The method of claim 12, wherein the multiple first key pictures include each key picture at the first time instance.

15. The method of claim 12, comprising:
   determining second 3D feature information of a second content in multiple second key pictures of the pictures at the first time instance based on a second pre-determined 3D feature model, the multiple second key pictures corresponding to the first time instance of multiple second views in the different views.

16. The method of claim 12, wherein
   the first feature information is associated with a first view in the multiple first views; and
   for each view of the different views that is not the first view, the method further includes:
      determining respective feature information based on a key picture of the view and another key picture of an adjacent view of the different views;
      determining a feature change to the respective feature information, the feature change corresponding to a respective picture of the view; and
      encoding, in the multi-view bitstream, the respective feature change.

17. The method of claim 14, wherein
the first picture of a view in the different views is at a second time instance.

18. The method of claim 17, further comprising:
encoding each picture of a first view of the multiple first views as a key picture, each picture of the first view corresponding to a respective time instance.

19. A method of processing visual media data, the method comprising:
   processing a multi-view bitstream of the visual media data according to a format rule, wherein
   the multi-view bitstream includes pictures; and
   the format rule specifies that:
      multiple first key pictures of the pictures are decoded from the multi-view bitstream, the pictures corresponding to different views, the multiple first key pictures corresponding to multiple first views of the different views, the multiple first key pictures corresponding to a first time instance;
      first feature information of a first content in the multiple first key pictures of the pictures is determined, the first feature information including first three-dimensional (3D) feature information indicated by the multiple first views, the first 3D feature information at the first time instance being determined based on a first pre-determined 3D feature model and the multiple first key pictures;
      a first feature change to the first feature information is decoded based on the multi-view bitstream, the first feature change indicating a change of the first content between a key picture in the multiple first key pictures and a first picture; and
      the first picture is reconstructed based on the decoded first feature change, the first feature information, and the key picture in the multiple first key pictures.

20. The method of claim 19, wherein the multiple first key pictures include each key picture at the first time instance.

* * * * *